US012614527B2

(12) United States Patent
Wu et al.

(10) Patent No.: US 12,614,527 B2
(45) Date of Patent: Apr. 28, 2026

(54) APPARATUS AND SYSTEM USING ACTIVE-MATRIX ELECTROWETTING-ON-DIELECTRIC (AM-EWOD)

(71) Applicant: CYTESI, INC., Menlo Park, CA (US)

(72) Inventors: Tung-Yu Wu, Hsinchu (TW); Chung-Yi Wang, Zhubei (TW); Tang-Hung Po, Zhubei (TW)

(73) Assignee: CYTESI, INC., Menlo Park, CA (US)

( * ) Notice: Subject to any disclaimer, the term of this patent is extended or adjusted under 35 U.S.C. 154(b) by 181 days.

(21) Appl. No.: 18/510,613

(22) Filed: Nov. 15, 2023

(65) Prior Publication Data

US 2024/0165625 A1 May 23, 2024

Related U.S. Application Data

(60) Provisional application No. 63/426,363, filed on Nov. 17, 2022.

(51) Int. Cl.
*G09G 3/34* (2006.01)
*B01L 3/00* (2006.01)

(52) U.S. Cl.
CPC ........ *G09G 3/348* (2013.01); *B01L 3/502715* (2013.01); *B01L 3/502792* (2013.01); *B01L 2300/0645* (2013.01); *B01L 2400/0427* (2013.01); *G09G 2300/0842* (2013.01); *G09G 2300/0871* (2013.01)

(58) Field of Classification Search
CPC ........... G09G 3/348; G09G 2300/0842; G09G 2300/0871; B01L 3/502715; B01L 2300/0645; B01L 2400/0427
See application file for complete search history.

(56) References Cited

U.S. PATENT DOCUMENTS

2020/0175932 A1* 6/2020 Hadwen ............... G01N 27/028

* cited by examiner

*Primary Examiner* — Priyank J Shah
(74) *Attorney, Agent, or Firm* — Juan Carlos A. Marquez; Marquez IP Law Office, PLLC

(57) ABSTRACT

An apparatus and a system are provided. The system includes a top plate electrode, a dielectric layer, a plurality of pixel electrode circuits, and a plurality of detection circuits. A droplet is disposed between the top plate electrode and the dielectric layer. The plurality of pixel electrode circuits are arranged in a two-dimensional array. The pixel electrode circuits in each column of the two-dimensional array are electrically connected to a respective detection circuit of the plurality of detection circuits.

19 Claims, 28 Drawing Sheets

APPARATUS AND SYSTEM USING ACTIVE-MATRIX ELECTROWETTING-ON-DIELECTRIC (AM-EWOD)

CROSS-REFERENCE TO RELATED APPLICATIONS

This application claims the benefit of U.S. Provisional Application No. 63/426,363, filed Nov. 17, 2022, the entire disclosure of which are incorporated by reference herein.

BACKGROUND

Technical Field

The present disclosure relates to electrowetting-on-dielectric (EWOD) systems, and, in particular, to an apparatus and a system using active-matrix electrowetting-on-dielectric (AM-EWOD).

Description of the Related Art

Microfluidics provide liquid management based on droplets. The droplets on the chip serve to transport a variety of reaction materials, including biochemical reagents, cells, proteins, DNA, and RNA. Microfluidics allow software-reconfigurable operations on individual droplets, such as movement, combination, splitting, and dispensation from reservoirs by manipulating Pico liter to Nano liter scale droplets in electric fields. A variety of experiments are accommodated by modular functional components (temperature control, magnetic attraction, fluorescence detection, etc.). Control in microfluidics is based on the principle of Electrowetting on Dielectric (EWOD), in which, when there is liquid on the electrode, and a potential is applied to the electrode, the wettability of the solid-liquid interface at the corresponding position of the electrode can be changed, and the contact angle of the droplet-electrode interface changes accordingly. If there is a potential difference between the electrodes in the droplet area, a lateral driving force will be generated because of the contact angle difference, causing the droplet to move laterally on the electrode substrate.

The electrodes and drivers in conventional digital microfluidics are simply connected passively. The number of wires and connection pads limit scalability accordingly, while the number of electrodes limits the application. Conventional technology can only generate/manipulate low-resolution droplets and is insufficient for single-cell applications.

SUMMARY

One aspect of the present disclosure provides an apparatus including a pixel electrode circuit and a detection circuit. The pixel electrode circuit includes a first switch, an inverter, a first transistor, a second transistor, and a third transistor. The first switch is controlled by a first control signal, and the first switch includes a first terminal electrically connected to a first voltage, and a second terminal electrically connected to a first node. The inverter is coupled between the first node and a second node. The first transistor has a gate electrically connected to the first node, a first terminal connected to a first power supply voltage, and a second terminal connected to a first output port of the pixel electrode circuit. The second transistor has a gate electrically connected to the first node, a first terminal connected to a third node, and a second terminal connected to a second output port of the pixel electrode circuit. The third transistor has a gate electrically connected to the second node, a first terminal connected to a fourth node, and a second terminal connected to the third node.

Another aspect of the present disclosure provides a system including a top plate electrode, a dielectric layer, a plurality of pixel electrode circuits, and a plurality of detection circuits. A droplet is disposed between the top plate electrode and the dielectric layer. The plurality of pixel electrode circuits are arranged in a two-dimensional array. The pixel electrode circuits in each column of the two-dimensional array are electrically connected to a respective detection circuit of the plurality of detection circuits.

BRIEF DESCRIPTION OF THE DRAWINGS

Aspects of some embodiments of the present disclosure are best understood from the following detailed description when read with the accompanying figures. It is noted that various structures may not be drawn to scale, and dimensions of the various structures may be arbitrarily increased or reduced for clarity of discussion.

DETAILED DESCRIPTION

Figure 1A:
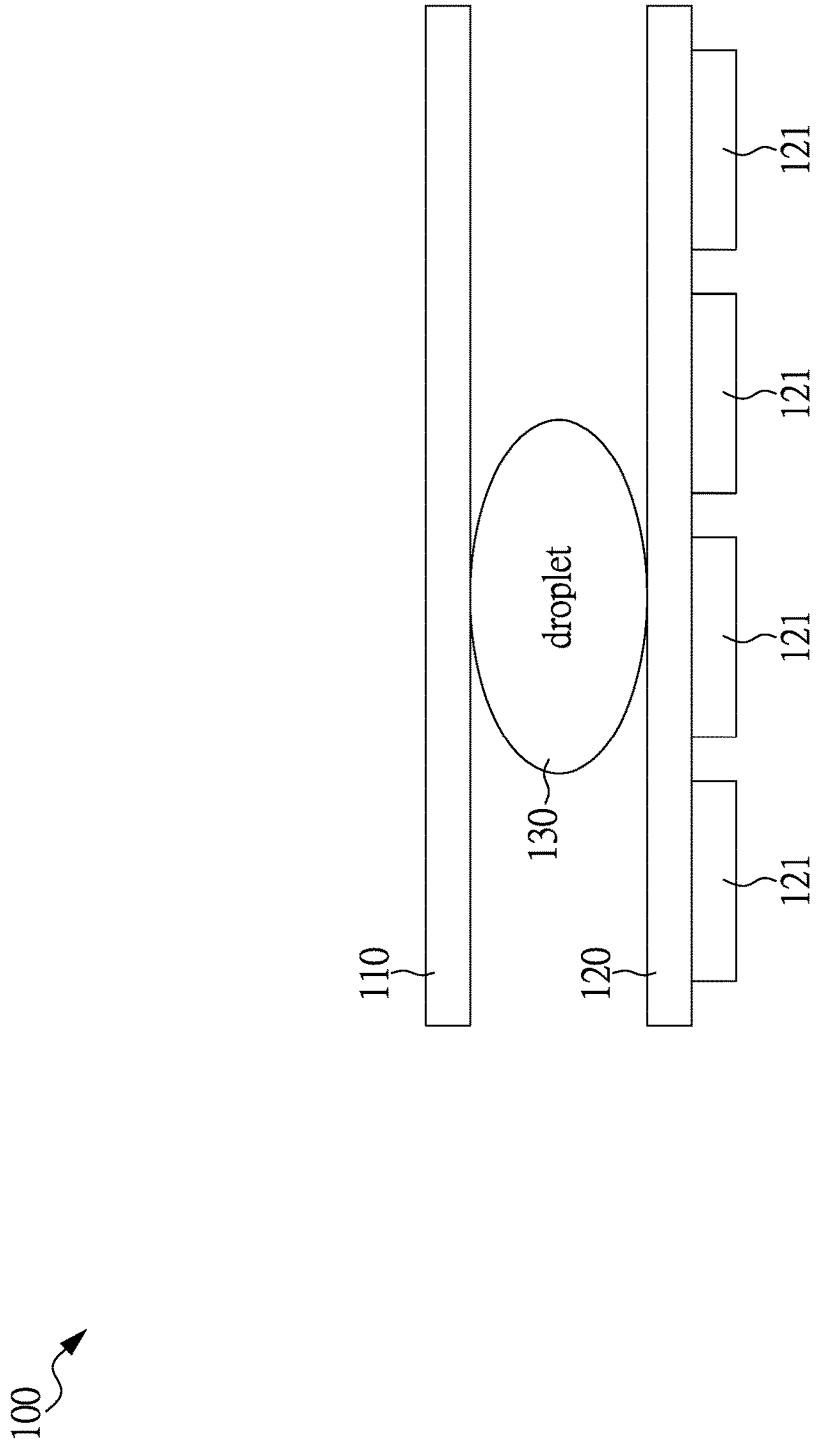
FIG. 1A is a cross-section of an active-matrix electrowetting on dielectric (AM-EWOD) driving system 100 in accordance with an embodiment of the present disclosure.

The following disclosure provides many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features may be formed or disposed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated from by such arrangement.

It should be noted that the structures, proportions, sizes, etc. shown in the drawings of the specification are only used to match the content recorded in the specification for the understanding and reading of those skilled in the art, and are not used to limit the implementation of this application, so it has no technical substantive meaning. Any modification of structure, change of proportional relationship or adjustment of size, without affecting the effect and purpose of this application, should still fall within the scope of this application. The disclosed technical content must be within the scope covered. At the same time, terms such as "above", "first", "second" and "one" quoted in this specification are only for the convenience of description and are not used to limit the scope of implementation of this application. The change or adjustment of the relative relationship shall also be regarded as the implementable scope of the present application without substantive change in the technical content.

Figure 1B:
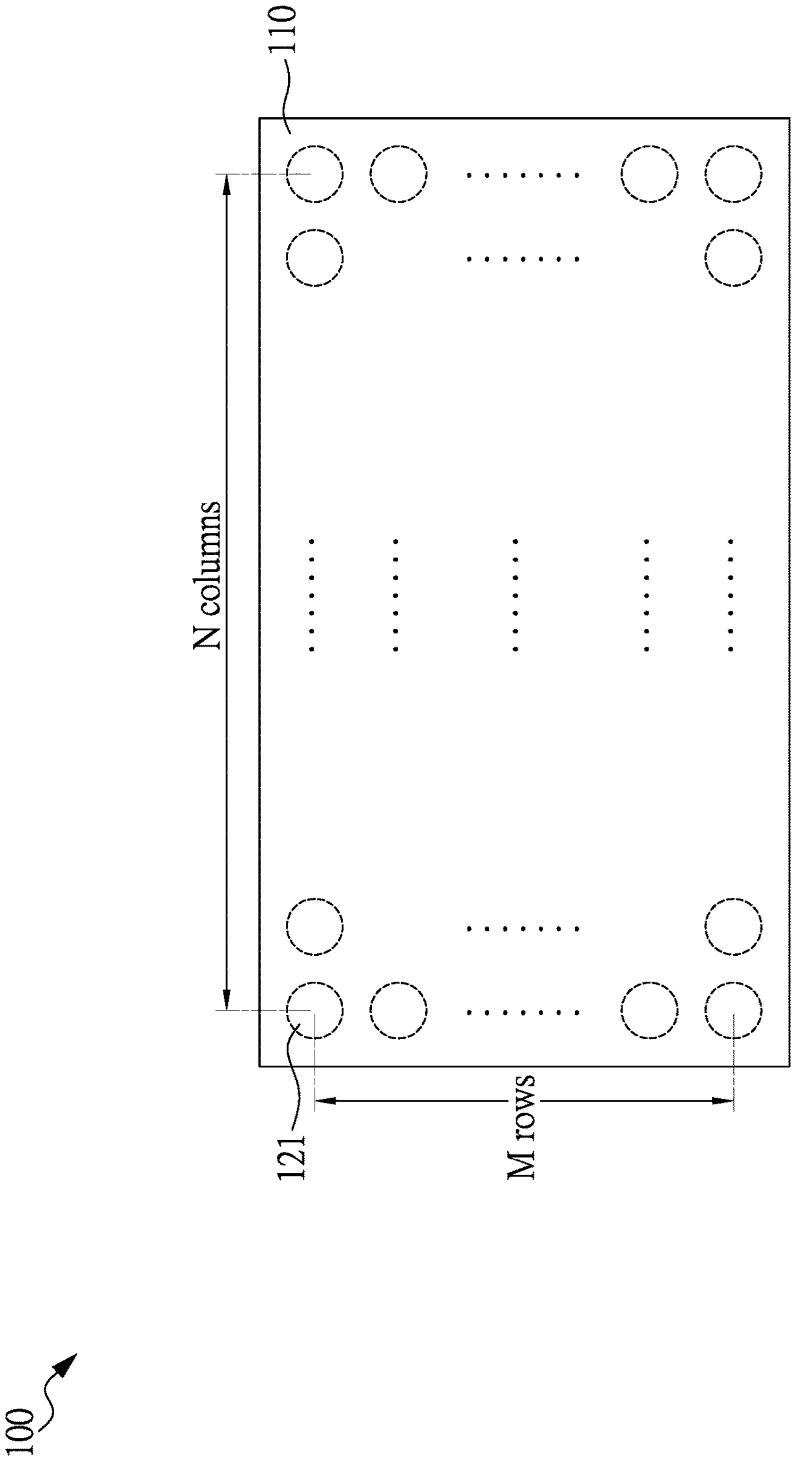
FIG. 1B is a top view of the AM-EWOD driving system 100 of FIG. 1A.

It should also be noted that the longitudinal section corresponding to the embodiments of the present application can correspond to the front view, the transverse section can correspond to the right view, and the horizontal section can correspond to the top view FIG. 1A is a cross-section of an active-matrix electrowetting on dielectric (AM-EWOD) driving system 100 in accordance with an embodiment of the present disclosure. FIG. 1B is a top view of the AM-EWOD driving system 100 in FIG. 1A.

Referring to FIGS. 1A and 1B, in an embodiment, the AM-EWOD driving system 100 may include a top plate electrode 110, a dielectric layer 120, and one or more droplets 130, as shown in FIG. 1A. The one or more droplets 130 may be disposed between the top plate electrode 110 and the dielectric layer 120. A plurality of pixel electrodes 121 may be disposed on a bottom surface of the dielectric layer 120 opposing to the droplets 130. The pixel electrodes 121 may be arranged in a two-dimensional array, such as M rows× N columns, as shown in FIG. 1B.

An AC (alternating-current) voltage signal VAC may be applied to the top plate electrode 110. The AC voltage signal VAC may have a predetermined voltage swing range. In one embodiment, the pixel electrode 121 is grounded, and thus activated. Thus, the voltage of the dielectric layer 120 is pulled to ground. Voltage difference between the top plate electrode 110 and the dielectric layer 120 changes the contact angle of the droplet 130, which can then be controlled accordingly.

In one embodiment, the pixel electrodes 121 the output terminals of the pixel electrodes 121 are floating, and thus are not activated. The dielectric layer 120 will be electrically coupled with the top plate electrode 110 due to the coupling capacitance of the droplet 130. In other words, the voltage level of the dielectric layer 120 may follow the AC voltage signal VAC, and there is no voltage difference between the top plate electrode 110 and the dielectric layer 120. Therefore, the droplet 130 will not be moved.

Figure 2:
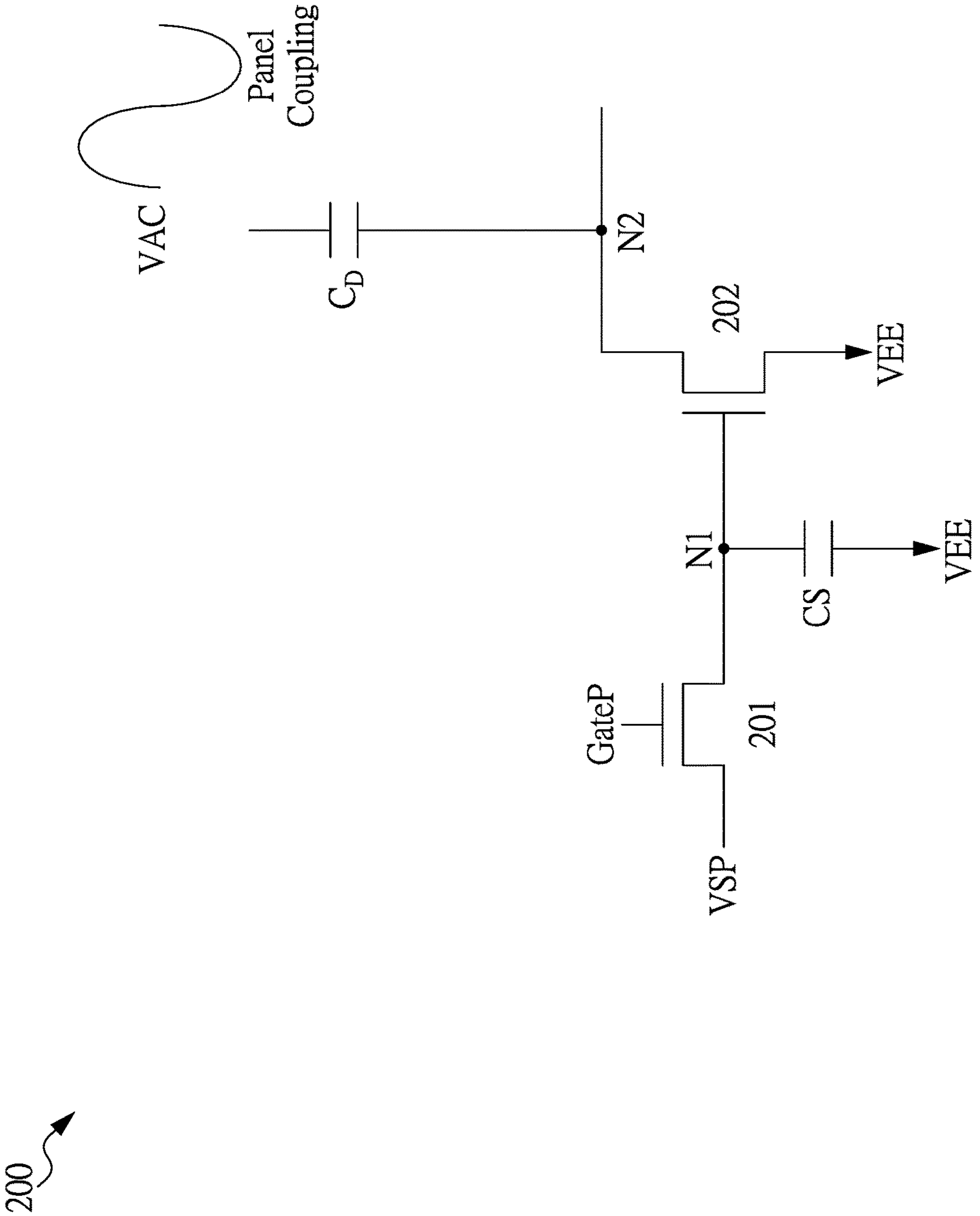
FIG. 2 is a schematic diagram of a pixel electrode circuit 200 in accordance with an embodiment of the present disclosure.

FIG. 2 is a schematic diagram of a pixel electrode circuit 200 in accordance with an embodiment of the present disclosure. Please refer to FIG. 1 and FIG. 2.

The pixel electrode circuit 200 in FIG. 2 may be an example of the pixel electrode 121 in FIG. 1. The pixel electrode circuit 200 may be implemented using a 2T1C (i.e., 2 transistors plus 1 capacitor) circuit which may include a first transistor 201 and a second transistor 202.

The first transistor 201 may be a switch controlled by a control signal GateP. A first terminal of the first transistor 201 is coupled to an input voltage VSP (i.e., a DC voltage). A second terminal of the first transistor 201 is coupled to node N1. The second transistor 202 may have a gate coupled to node N1, a drain being an output terminal, and a source being grounded. In some embodiments, a capacitor CS is coupled between node N1 and the ground.

The first transistor 201 is a first type transistor, and the second transistor 202 is a second type transistor. In one embodiment, the first transistor 201 may be P-type transistor, and the second transistor 202 may be N-type transistor. In some embodiments, the first transistor 201 may be a PMOS transistor, and the second transistor 202 an NMOS transistor.

In an exemplary description of the operations of the pixel electrode circuit 200 in FIG. 2, it is assumed that the control signal GateP is in a high-logic state, indicating that the first transistor 201 is turned on. When the input voltage VSP is in the high-logic state, the input voltage VSP may pass through the first transistor 201. Thus, node N1 may be charged to the input voltage VSP. At this time, the second transistor 202 is turned on, and the voltage Vtop at the output terminal (i.e., node N2) of the second transistor 202 is pulled down to the ground (e.g., VSS or 0V). When the input voltage VSP is in the low-logic state, the input voltage VSP may reach node N1 through the first transistor 201, and thus the voltage level at node N1 is also charged to the input voltage VSP. At this time, the second transistor 202 is turned off, and the output terminal (i.e., node N2) of the second transistor 202 is floating. Therefore, the voltage Vtop at the output terminal of the second transistor 202 may follow the AC voltage signal VAC on the top plate electrode 110 through the coupling capacitance CD of the droplet 130.

With respect to the pixel electrode circuit 200 shown in FIG. 2, a very high voltage (i.e., a positive voltage VCC) is needed to turn the second transistor 202 on and off. Otherwise, the second transistor 202 will not function as expected. For example, the second transistor 202 can be fully turned off when the input voltage VSP is at a very low voltage (i.e., a negative voltage VEE), so the output terminal (i.e., node N2) of the second transistor 202 is floating at this time. It should be noted that since a very low voltage is used for the input voltage VSP, a very high voltage is also used for the input voltage VSP for switching as well. Thus, the first transistor 201 may suffer the stress of a very high voltage swing between voltages VCC and VEE, and it may cause failure of the voltage stress test for the first transistor 201.

In the embodiment of FIG. 2, a very wide voltage swing range is required to turn the second transistor 202 on and turn off. For example, a very low voltage is applied to the second transistor 202 to ensure that the second transistor 202 is fully turned off while the voltage Vtop is floating. In this case, the first transistor 201 should provide a very wide voltage swing range of the input voltage VSP. However, such conditions will cause a failure of the voltage stress test for the first transistor 201. Therefore, a modified design is provided in the embodiment of FIG. 3

Figure 3:
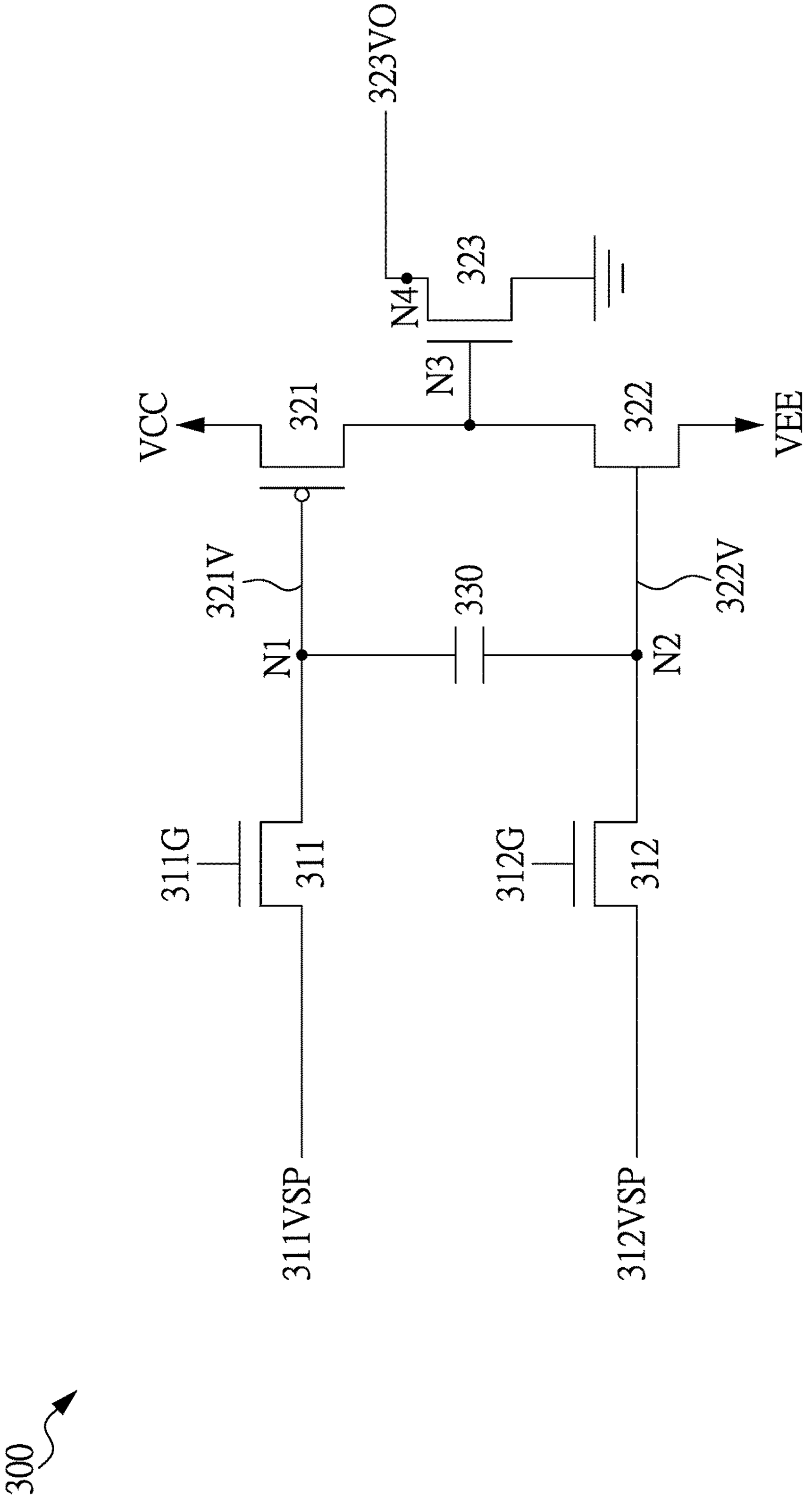
FIG. 3 is a schematic diagram of a pixel electrode circuit 300 in accordance with another embodiment of the present disclosure.

FIG. 3 is a schematic diagram of a pixel electrode circuit 300 in accordance with another embodiment of the present disclosure.

In another embodiment, the pixel electrode circuit 300 shown in FIG. 3 may be implemented using a 5T1C (i.e., 5 transistors plus 1 capacitor) circuit, which is modified from the pixel electrode circuit 200 in FIG. 2. For example, the pixel electrode circuit 300 shown in FIG. 3 may include a transistor 311, a transistor 312, and transistors 321, 322, and 323.

In some embodiments, the transistor 311 and the transistor 312 may be implemented using N-type transistors. The transistor 321 may be a P-type transistor, and the transistors 322 and 323 may be N-type transistors. The present disclosure is not limited thereto.

The transistor 311 may be controlled by control signal 311G. The transistor 322 may be controlled by control signal 312G. The transistor 311 may have a first terminal coupled to the input voltage 311VSP, and a second terminal coupled to node N1. The transistor 312 may have a first terminal coupled to the input voltage 312VSP, and a second terminal coupled to node N2. In some embodiments, a capacitor 330 may be coupled between nodes N1 and N2. The transistor 321 may have a gate coupled to node N1, a terminal (such as a source) coupled to the positive power supply voltage VCC, and a further terminal (such as a drain) coupled to node N3. The transistor 322 may have a gate coupled to node N2, a terminal (such as a source) coupled to the negative power supply voltage VEE, and a further terminal (such as a drain) coupled to node N3. The transistor 323 may have a gate coupled to node N3, a terminal (such as a source) being grounded, and a further terminal (such as a drain) being an output terminal (i.e., node N4) providing a voltage 323VO.

As shown in FIG. 3, the input voltage 311VSP is a relatively high voltage (i.e., a positive voltage), and the input voltage 312VSP is a relatively low voltage (i.e., a negative voltage). Given that the control signals 311G and 312G are in the high-logic state, the transistor 311 and the transistor 312 are turned on, so the input voltage 311VSP may reach node N1 through the transistor 311, and the input voltage 312VSP may reach node N2 through the transistor 312. The transistor 311 provides an input voltage 321V to the transistor 321 through node N1. The transistor 322 provides an input voltage 322V to the transistor 322 through node N2.

Given that the positive power supply voltage VCC is equal to +Vcc and the negative power supply voltage VEE is equal to −Vee, the voltage swing range at node N1 in FIG. 3 may be between +Vcc and −Vee.

Referring to FIG. 2, if the pixel electrode circuit 200 shown in FIG. 2 is used, the first transistor 201 may have a wider voltage swing range between (+Vcc+Vth1) and (−Vee−Vth2), wherein Vth1 and Vth2 denote the threshold voltages of the transistors 201 and 202, respectively. Thus, the voltage difference between the highest voltage and the lowest voltage in the voltage swing range of the first transistor 201 in FIG. 2 is Vcc+Vee+Vth1+Vth2.

Referring back to FIG. 3, if the pixel electrode circuit 300 shown in FIG. 3 is used, the voltage swing range at node N1 (i.e., transferring the input voltage 321V) may be between +Vcc and 0V. The voltage swing range of the transistor 311 may be between (+Vcc+Vth1) and −Vth2, wherein Vth1 denotes the threshold voltage of the transistor 321, and Vth2 denotes the threshold voltage of the transistors 311, 312, and 322. Thus, the voltage difference between the highest voltage and the lowest voltage in the voltage swing range of the transistor 311 in FIG. 3 is Vcc+Vth1+Vth2. In comparison with FIG. 2, the voltage swing range at node N1 transferring the input voltage 321V in FIG. 3 may be reduced from (Vcc+Vee+Vth1+Vth2) to (Vcc+Vth1+Vth2).

Similarly, the voltage swing range at node N2 may be between −Vee and (−Vee+Vref), wherein the reference voltage Vref may indicate a predetermined voltage to turn the transistor MN1 on and off. Thus, the voltage swing range for the transistor 312 may be between (−Vee−Vth1) and (−Vee+Vref+Vth2). In comparison with the pixel electrode circuit 200 in FIG. 2, the voltage swing range of the transistor 312 in FIG. 3 can be reduced from (Vref+Vee+Vth1+Vth2) to (Vref+Vth1+Vth2). Accordingly, the design of the pixel electrode circuit 300 in FIG. 3 can effectively reduce the voltage swing range of transistors, thereby increasing the probability of passing the voltage stress test.

Figure 4:
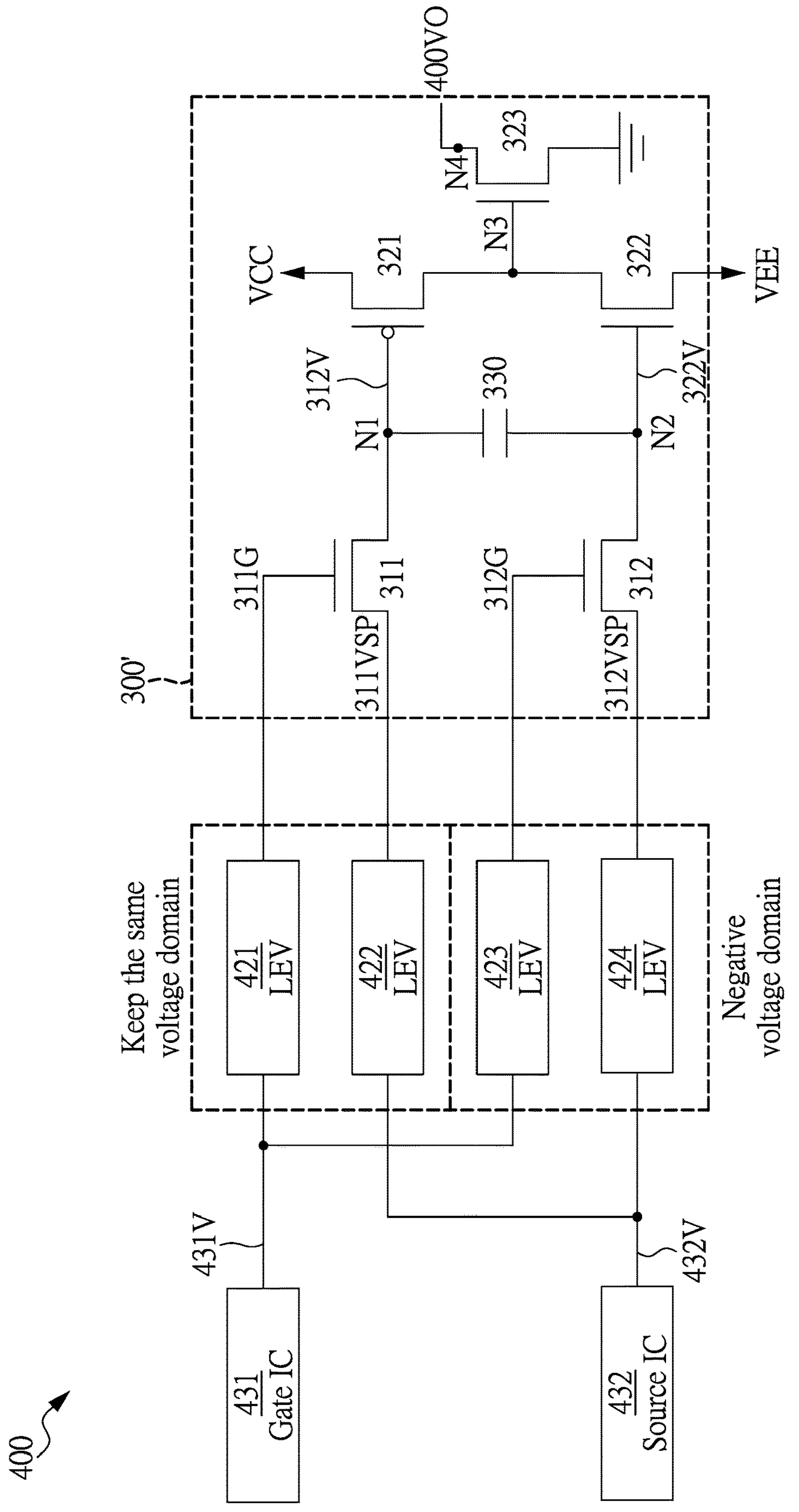
FIG. 4 is a schematic diagram of a pixel electrode circuit 400 in accordance with yet another embodiment of the present disclosure.

FIG. 4 is a schematic diagram of a pixel electrode circuit 400 in accordance with yet another embodiment of the present disclosure.

In yet another embodiment, the pixel electrode circuit 400 shown in FIG. 4 may include a pixel electrode circuit 300', a plurality of level shifters 421,422, 423, 424, a gate driver integrated circuit (IC) 431, and a source driver IC 432. The pixel electrode circuit 300' may be similar to the pixel electrode circuit 300 shown in FIG. 3. However, the control signals 311G and 321G, and the input voltage 311VSP and input voltage 312VSP of the pixel electrode circuit 400 may be from the level shifters 421, 423, 422, and 424, respectively.

The gate driver integrated circuit (IC) 431 may provide a first driving voltage 431V to the level shifters (LEVs) 421 and 423. The source driver IC 432 may provide a second driving voltage 432V to the level shifters 422 and 424.

The level shifter 421 may convert the first driving voltage 431V to the control signal 311G, such as converting a first voltage level of the first driving voltage 431V to a second voltage level of the control signal 311G. The level shifter 422 may convert the second driving voltage 432V to the input voltage 311VSP, such as converting a third voltage level of the second driving voltage 432V to a fourth voltage level of the input voltage 311VSP. It should be noted that the control signal 311G, the input voltage 311VSP, and the first driving voltage 431V are kept in the same voltage domain by the level shifters 421 and 422.

The delay of each path of the control signals 311G and 312G, and the input voltage 311VSP and 312VSP may differ. The level shifters 421, 422, 423, 424 may be used to balance the delays of the control signals 311G and 312G, and the input voltage 311VSP and 312VSP. The control signal 311G and the input voltage 311VSP may be substantially provided to the transistor 311 at the same time. The control signal 312G and the input voltage 312VSP may be substantially provided to the transistor 312 at the same time.

The level shifter 423 may convert the first driving voltage 431V to the control signal 312G, such as converting the third voltage level of the second driving voltage to a fifth voltage level of the control signal 312G. The level shifter 424 may convert the second driving voltage 432V to the input voltage 312VSP, such as converting the third voltage level of the second driving voltage 432V to a sixth voltage level of the control signal 312G. It should be noted that the second driving voltage 432V may be in a positive voltage domain. The control signal 312G and the input voltage 312VSP respectively generated from the level shifters 423 and 424 may be in a negative voltage domain. Therefore, the voltage swing range of the transistor 311 in FIG. 4 may be similar to that of the transistor 311 in FIG. 3. The voltage swing range of the transistor 312 in FIG. 4 may be similar to that of the transistor 312 in FIG. 3. A result of voltage stress test will be enhanced.

Figure 5:
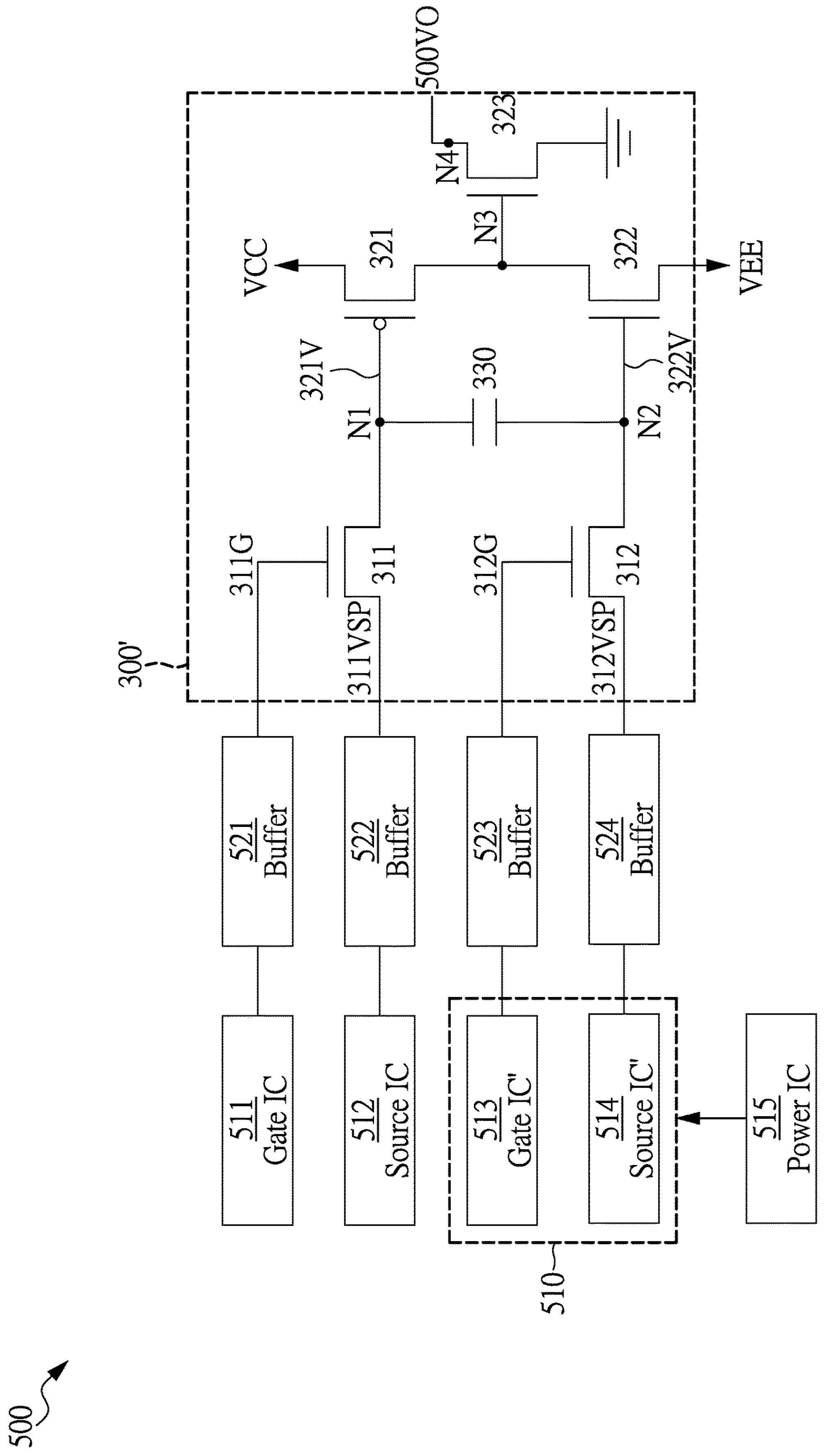
FIG. 5 is a schematic diagram of a pixel electrode circuit 500 in accordance with yet another embodiment of the present disclosure.

FIG. 5 is a schematic diagram of a pixel electrode circuit 500 in accordance with yet another embodiment of the present disclosure.

The design concept of the pixel electrode circuit 500 in FIG. 5 may be similar to that of the pixel electrode circuit 400 in FIG. 4. For example, the pixel electrode circuit 500 in FIG. 5 may include a pixel electrode circuit 300', a plurality of buffers 521,522, 523, 524, gate driver integrated circuits (ICs) 511 and 513, source driver ICs 512 and 514, and a power IC 515.

In some embodiments, the gate driver integrated circuit (IC) 513 and the source driver IC 514 may receive a voltage in the negative voltage domain from the power IC 515. The gate driver integrated circuit (IC) 513 may convert the voltage received from the power IC 515 to the control signal to 312G through the buffer 523. The control signal to 312G may be stored in the buffer 523. The source driver IC 514 may convert the voltage received from the power IC 515 to the input voltage 312VSP through the buffer 524. The input voltage 312VSP may be stored in the buffer 524. The gate driver integrated circuit (IC) 511 may provide the control signal 311G in the positive voltage domain through the buffer 521. The control signal 311G may be stored in the buffer 521. The source driver IC 512 may provide the input voltage 311VSP in the positive voltage domain through the buffer 522. The input voltage 311VSP may be stored in the buffer 522.

The voltage swing range of the transistor 311 in FIG. 5 may be similar to that of the transistor 311 in FIG. 3. The voltage swing range of the transistor 312 in FIG. 5 may be similar to that of the transistor 312 in FIG. 3, thereby increasing the probability of passing the voltage stress test.

Figure 6:
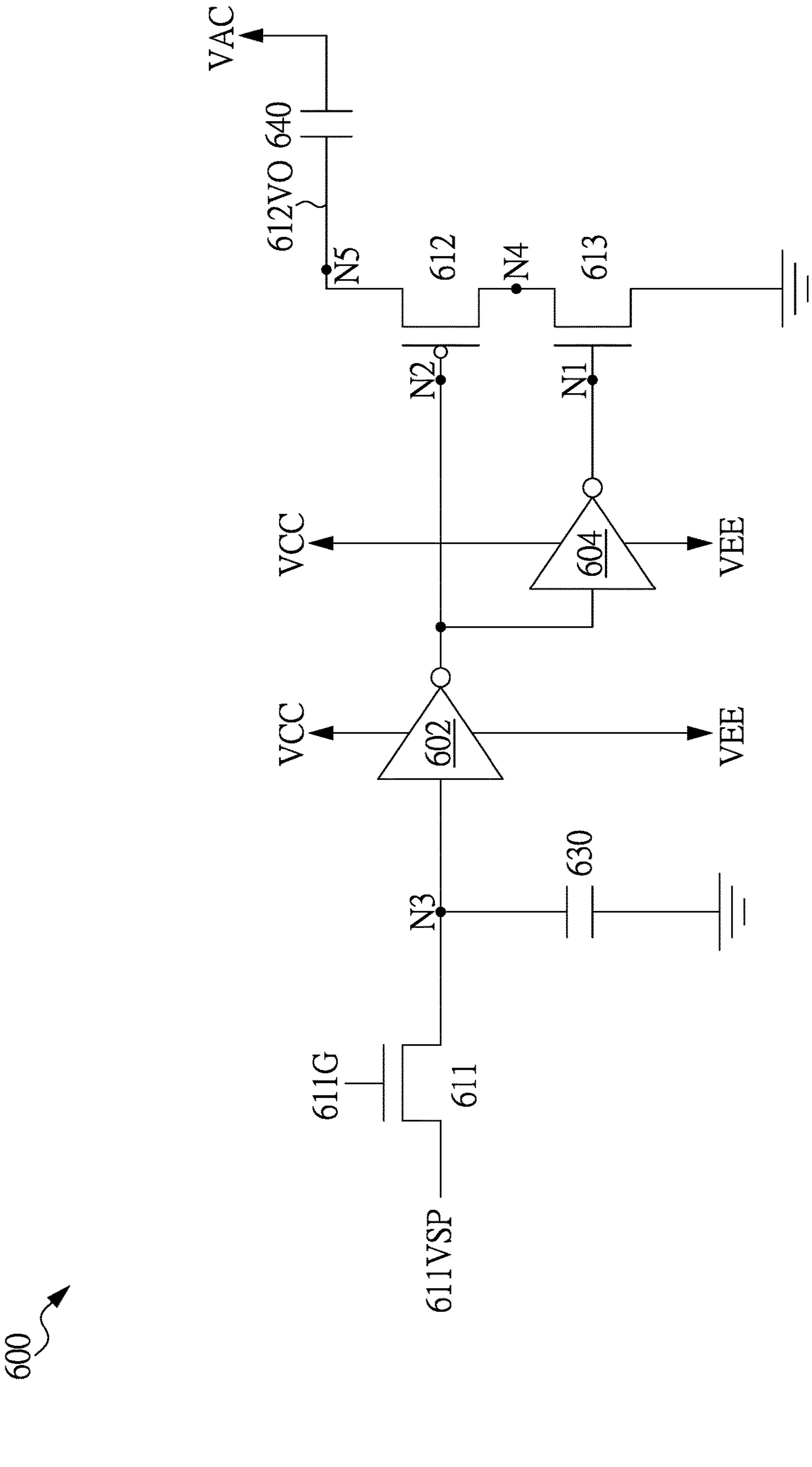
FIG. 6 is a schematic diagram of a pixel electrode circuit 600 in accordance with yet another embodiment of the present disclosure.

FIG. 6 is a schematic diagram of a pixel electrode circuit 600 in accordance with yet another embodiment of the present disclosure.

In yet another embodiment, there may be some signal skews at nodes N1 and N2 in the pixel electrode circuit 300 in FIG. 3 or the pixel electrode circuit 300' in FIGS. 4 and 5, which may cause some short current through the transistors 321 and 322. As a result, the short current will cause redundant power consumption, or damage the transistors if the signal skew is too large.

The pixel electrode circuit 600 shown in FIG. 6 is proposed to solve the signal skew issue and simplify the power domain of the pixel electrode circuits in FIGS. 4 and 5.

As shown in FIG. 6, the pixel electrode circuit 600 may be a cascode pull-down circuit, which includes transistors 611, 612, and 613, inverters 602 and 604, and a capacitor 630.

The transistor 611 may be a switch controlled by the control signal 611G. The transistor 611 may have a first terminal coupled to the input voltage 611VSP. The transistor 611 may have a second terminal coupled to a third node N3.

The inverters 602 and 604 may form a cascode inverter stage supplied with power supply voltages VCC and VEE. The inverter 602 may have an input terminal coupled to node N3, and an output terminal coupled to node N2. The inverter 604 may have an input terminal coupled to node N2, and an output terminal coupled to node N1.

The transistor 612 may have a gate coupled to node N2. The transistor 612 may have a drain coupled to node N4. The transistor 612 may have a source coupled to node N5 which refers to an output terminal (i.e., node N5) of the pixel electrode circuit 600 providing an output voltage 612VO.

The transistor 613 may have a gate coupled to node N1. The transistor 613 may have a drain coupled to node N4. The transistor 613 may have a source coupled to the ground.

In some embodiments, the transistor 611 may be an N-type transistor, the transistor 612 may a P-type transistor, and the transistor 613 may be an N-type transistor.

The capacitor 630 is coupled between node N3 and the ground. Equivalent capacitance 640 is between the top plate electrode and the output terminal of the pixel electrode circuit 600. The voltage signal VAC is an AC voltage signal. The voltage signal VAC may be applied to the top plate electrode 110 as shown in FIG. 1. A terminal of the equivalent capacitance 640 may be coupled to the output terminal (i.e., node N5) of the pixel electrode circuit 600.

For example, the input voltage 611VSP may range between VCC and VEE, and will charge the capacitor 630. When the pixel electrode circuit 600 enters a pull-down mode, the input voltage 611VSP is equal to the power supply voltage VCC (i.e., 611VSP=VCC), the voltage at node N2 is equal to the power supply voltage VEE, and the voltage at node N1 is equal to the power supply voltage VCC. For purposes of description, it is assumed that VEE=−Vee and VCC=+Vcc, and the voltage signal VAC may be an AC voltage signal swing between +Vac and −Vac. In this case, both the transistors 612 and 613 will be turned on, and therefore the output terminal (i.e., node N5) of the pixel electrode circuit 600 will be pulled down to the ground even though node N5 is coupled to the voltage signal VAC through the equivalent capacitance 640. Referring to the AM-EWOD driving system 100 of FIG. 1, voltage difference between the dielectric layer 120 and the top plate electrode 110 will change the contact angle of the droplet 130 to control movement of the droplet 130.

In addition, when the pixel electrode circuit 600 enters a floating mode, the input voltage 611VSP is equal to the power supply voltage VEE (i.e., VSP=VEE), the voltage at node N2 is equal to the power supply voltage VCC, and the voltage at node N1 is equal to the power supply voltage VEE. In this situation, the voltage 612VO at node N5 may follow the voltage signal VAC through the equivalent capacitance 640. For example, if the voltage 612VO at node N5 is positive, the transistor 612 may be turned on, but the transistor 613 is turned off due to the negative input voltage at node N1. The voltage 612VO at the output terminal (i.e., node N5) of the pixel electrode circuit 600 will not be pulled down to the ground since the current path through the transistors 612 and 613 does not exist. Therefore, the output terminal (i.e., node N5) of the pixel electrode circuit 600 will be floating in this case, and the voltage 612VO at node N5 may follow the voltage signal VAC through the equivalent capacitance 640.

If the voltage 612VO at node N5 is negative, the transistor 612 will be turned off, and thus the voltage 612VO at the output terminal (i.e., node N5) of the pixel electrode circuit 600 will not be pulled down to the ground. Therefore, the output terminal (i.e., node N5) of the pixel electrode circuit 600 will be floating in this case, and the voltage 612VO at node N5 may follow the voltage signal VAC through the equivalent capacitance 640. Therefore, when the pixel electrode circuit 600 enters the floating mode, the voltage 612VO at the output terminal (i.e., node N5) of the pixel electrode circuit 600 will be similar to the voltage signal VAC due to the coupling effect, and there will be no voltage difference between the pixel electrode circuit 600 and the top plate electrode 110, and the droplet 130 will not move at this time. In some embodiments, the transistor 612 may be an N-type transistor, and the transistor 613 may be a P-type transistor, and the operations thereof may be similar to those described.

Figure 7:
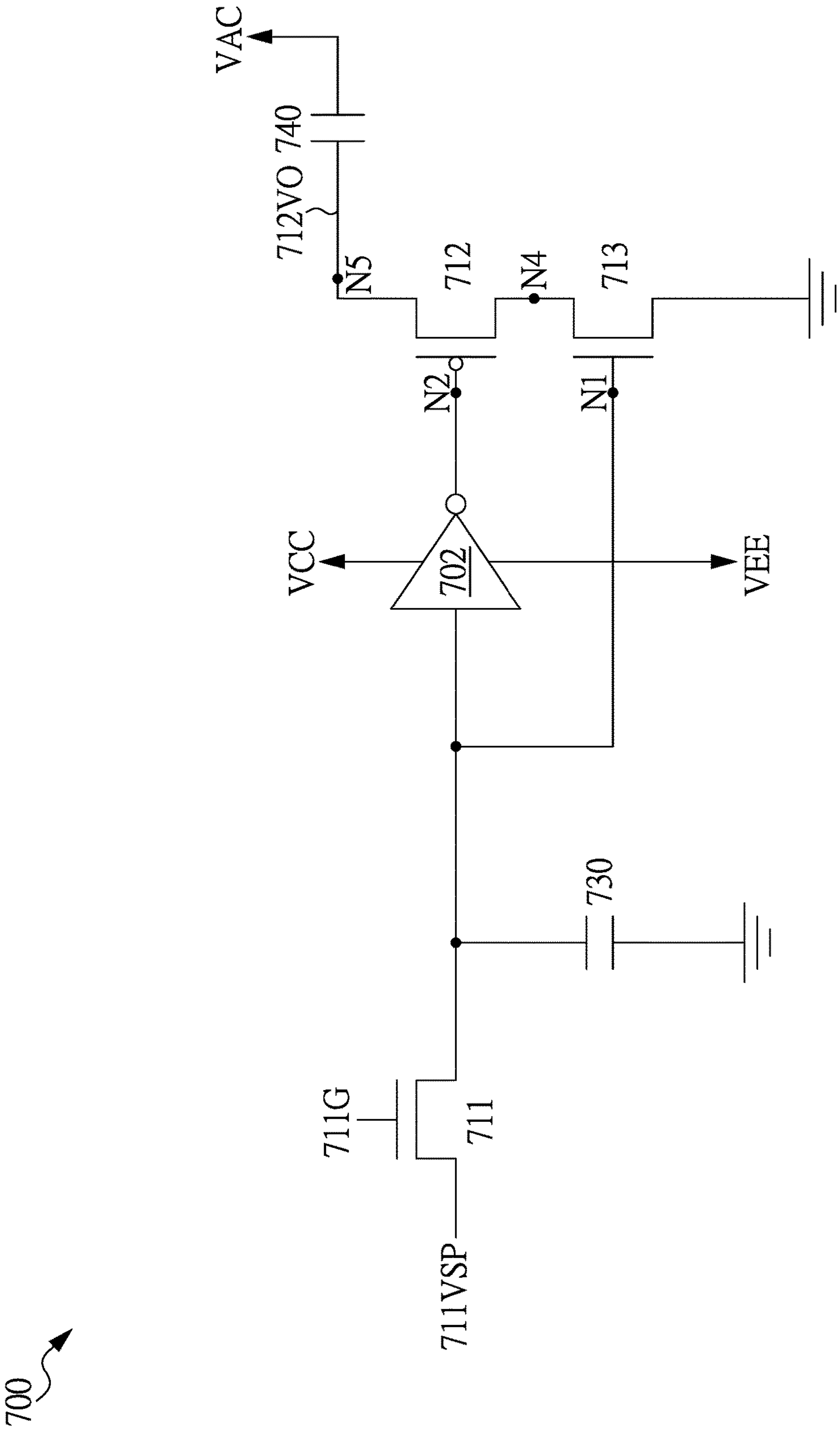
FIG. 7 is a schematic diagram of a pixel electrode circuit 700 in accordance with yet another embodiment of the present disclosure.

FIG. 7 is a schematic diagram of a pixel electrode circuit 700 in accordance with yet another embodiment of the present disclosure.

In yet another embodiment, the pixel electrode circuit 700 shown in FIG. 7 may be similar to the pixel electrode circuit 600 shown in FIG. 6. The pixel electrode circuit 700 may be a cascode pull-down circuit with only one inverter. In some embodiments, the inverter 604 shown in FIG. 6 may be omitted. In the embodiment of FIG. 7 the capacitor 730 is coupled between node N1 and the ground. The inverter 702 is coupled between node N1 and node N2. The gate of the transistor 713 is coupled to node N1. The operations of the transistors 712 and 713 in FIG. 7 may be similar to those of the transistors 612 and 613 in FIG. 6, and thus details thereof are not repeated here. In some embodiments, the transistor 711 may be an N-type transistor, the transistor 712 may a P-type transistor, and the transistor 713 may be an N-type transistor. In some embodiments, the transistor 712 may be an N-type transistor, and the transistor 713 may be a P-type transistor.

Figure 8:
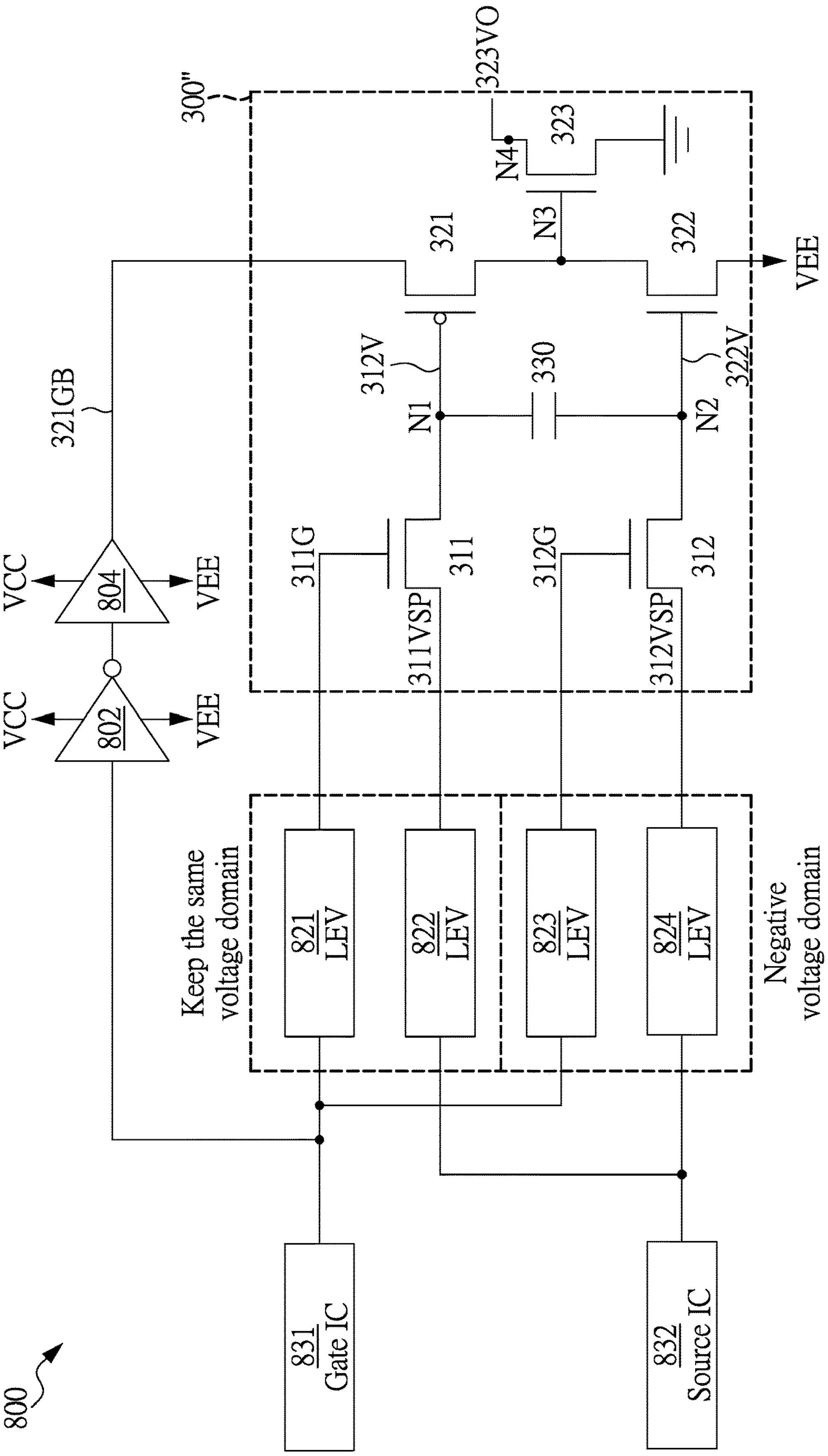
FIG. 8 is a schematic diagram of a pixel electrode circuit 800 in accordance with yet another embodiment of the present disclosure.

FIG. 8 is a schematic diagram of a pixel electrode circuit 800 in accordance with yet another embodiment of the present disclosure.

Figure 9:
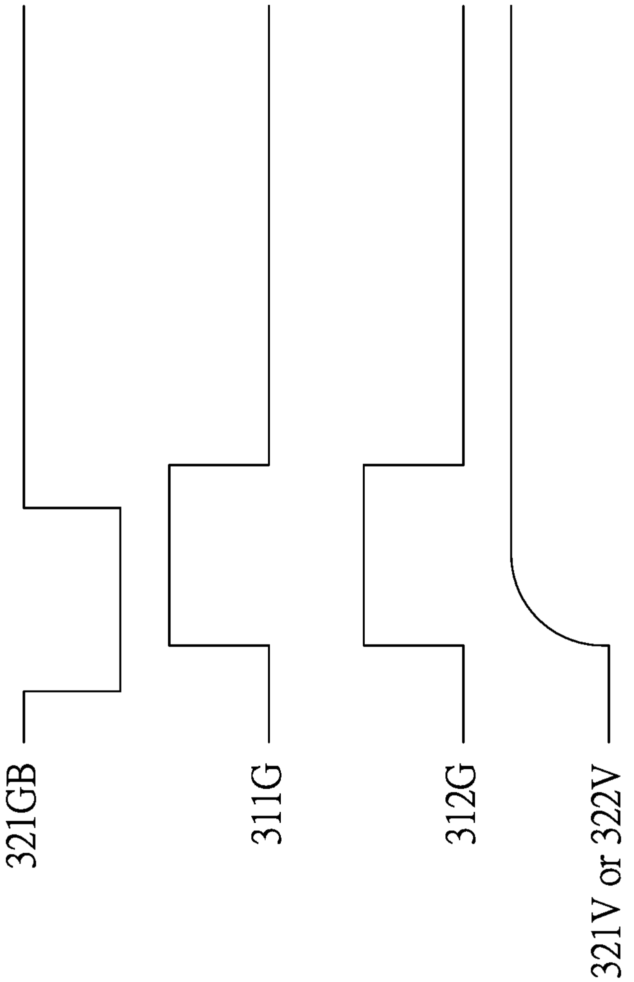
FIG. 9 is a waveform diagram of various signals in the pixel electrode circuit 800 in accordance with the embodiment of FIG. 8.

FIG. 9 is a waveform diagram of various signals in the pixel electrode circuit 800 in accordance with the embodiment of FIG. 8.

In yet another embodiment, the pixel electrode circuit 800 shown in FIG. 8 may be similar to the pixel electrode circuit 400 shown in FIG. 4. The pixel electrode circuit 800 may include a pixel electrode circuit 300", an inverter 802, a buffer 804, a plurality of level shifters (LEVs) 821, 822, 823, 824, a gate driver integrated circuit (IC) 831, and a source driver IC 832.

The source of the transistor 321 in the pixel electrode circuit 300" may be coupled to a control signal 321GB. In one embodiment, the driving voltage generated by the gate driver IC 831 may be sent to the inverter 802. The inverter 802 provides the output voltage referring to the control signal 321GB. The control signal may be stored in the buffer 804.

Referring to FIG. 1B, the pixel electrodes 121 may be arranged in a two-dimensional array of M rows*N columns. The pixel electrodes 121 in each row may have a respective control signal 321GB. M row pixel electrodes provide 321GB1 to 321GBM (not shown in FIG. 8). When the pixel electrodes 121 are implemented using the pixel electrode circuit 800, the pixel electrodes 121 in the same row may share the same control signal 321GB.

FIG. 9 is a waveform diagram of signals in the pixel electrode circuit 800 of FIG. 8, including the a control signal 321GB, control signal 311G, control signal 312G, an input voltage 321V, and input voltage 322V. In some embodiments, the delay of the control signal 321GB may be shorter than that of the control signal 311G and control signal 312G via proper circuit design.

When the first driving voltage provided by the gate driver IC 831 is switched from the high logic state to the low logic state, the control signal 321GB will be switched to the low logic state (i.e., a relatively low voltage) prior to the control signal 311G and control signal 312G being switched to the low logic state. In response to the control signal 321GB being in the low logic state, the transistor 321 is turned off. In this case, the signal skews of the control signal 311G, control signal 312G, input voltage 311VSP, and input voltage 312VSP will not cause any short circuit current since the transistor 321 is turned off.

After the control signal 321GB is switched to the high logic state (i.e., a relatively high voltage), the transistor 321 may function normally as described in the embodiment of FIG. 4.

Figure 10:
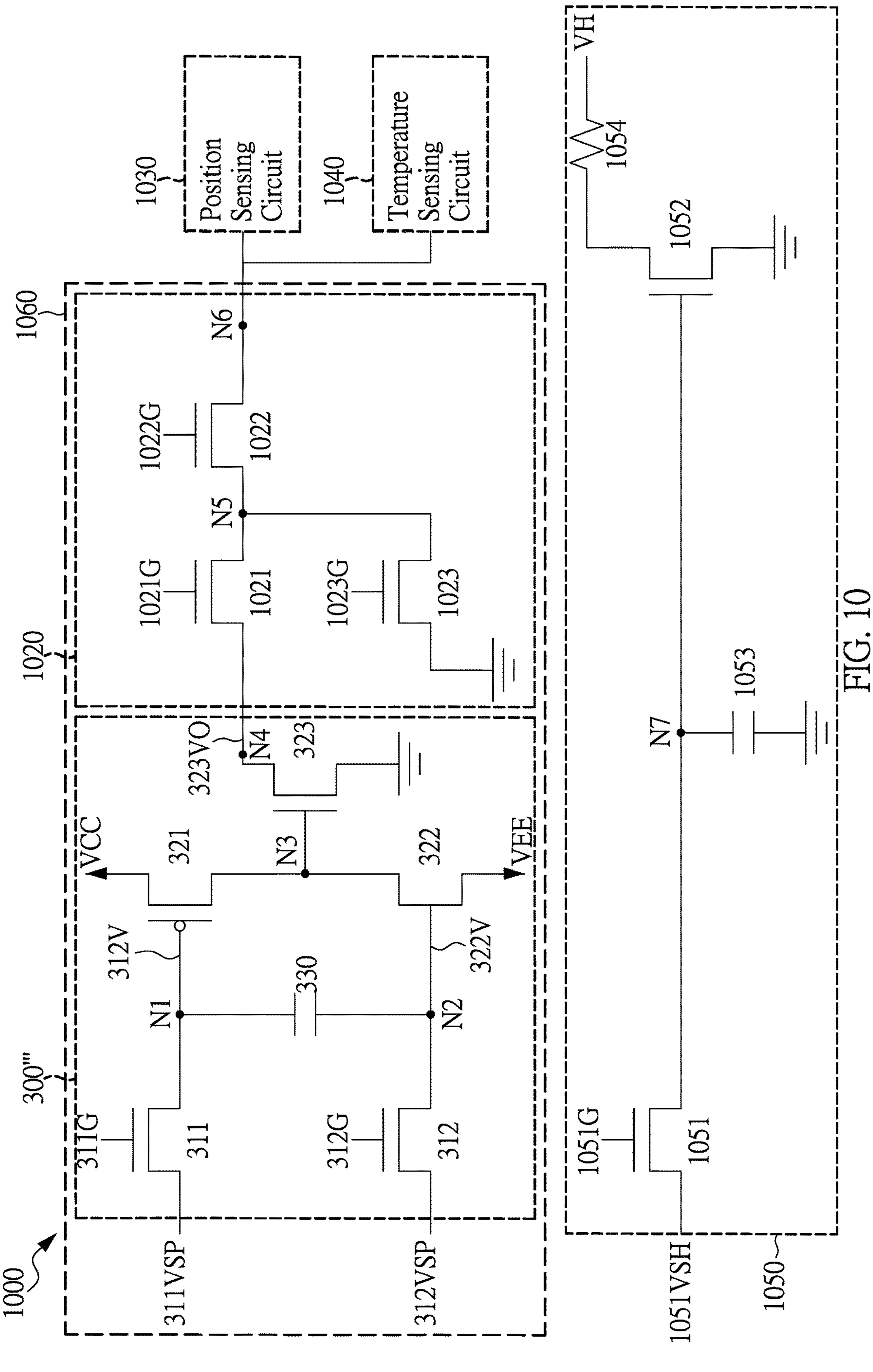
FIG. 10 is a schematic diagram of an AM-EWOD driving system 1000 in accordance with an embodiment of the present disclosure.

FIG. 10 is a schematic diagram of an AM-EWOD driving system 1000 in accordance with an embodiment of the present disclosure.

Figure 11:
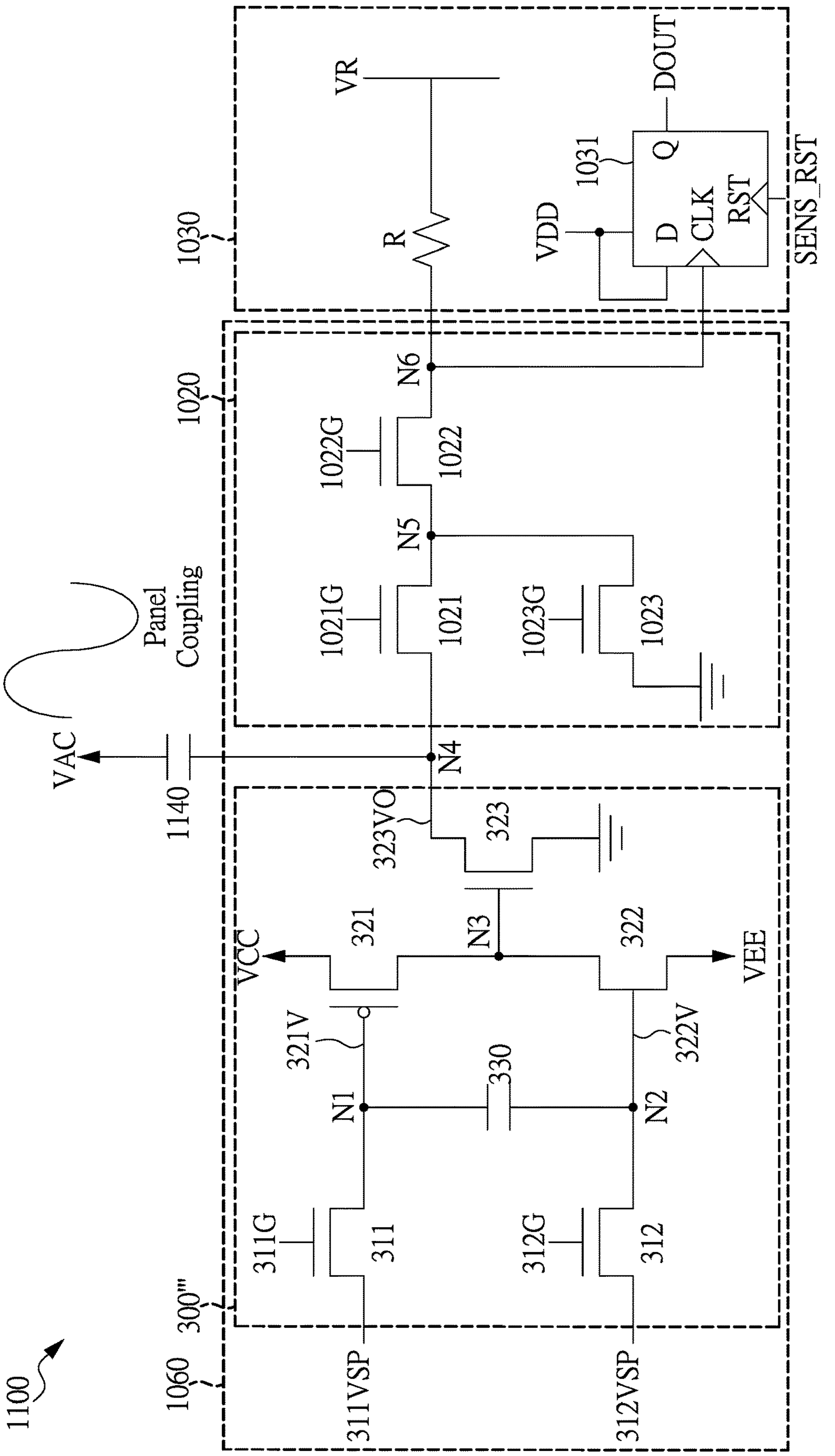
FIG. 11 is a schematic diagram of the AM-EWOD driving system 1000 including the output stage of the pixel electrode circuit 300''', the detection control circuit 1020, and the position detection circuit 1030 in accordance with the embodiment of FIG. 10.

FIG. 11 is a schematic diagram of the AM-EWOD driving system 1100 including the output stage of the pixel electrode circuit 300", the detection control circuit 1020, and the position detection circuit 1030 in accordance with the embodiment of FIG. 10.

Figure 12:
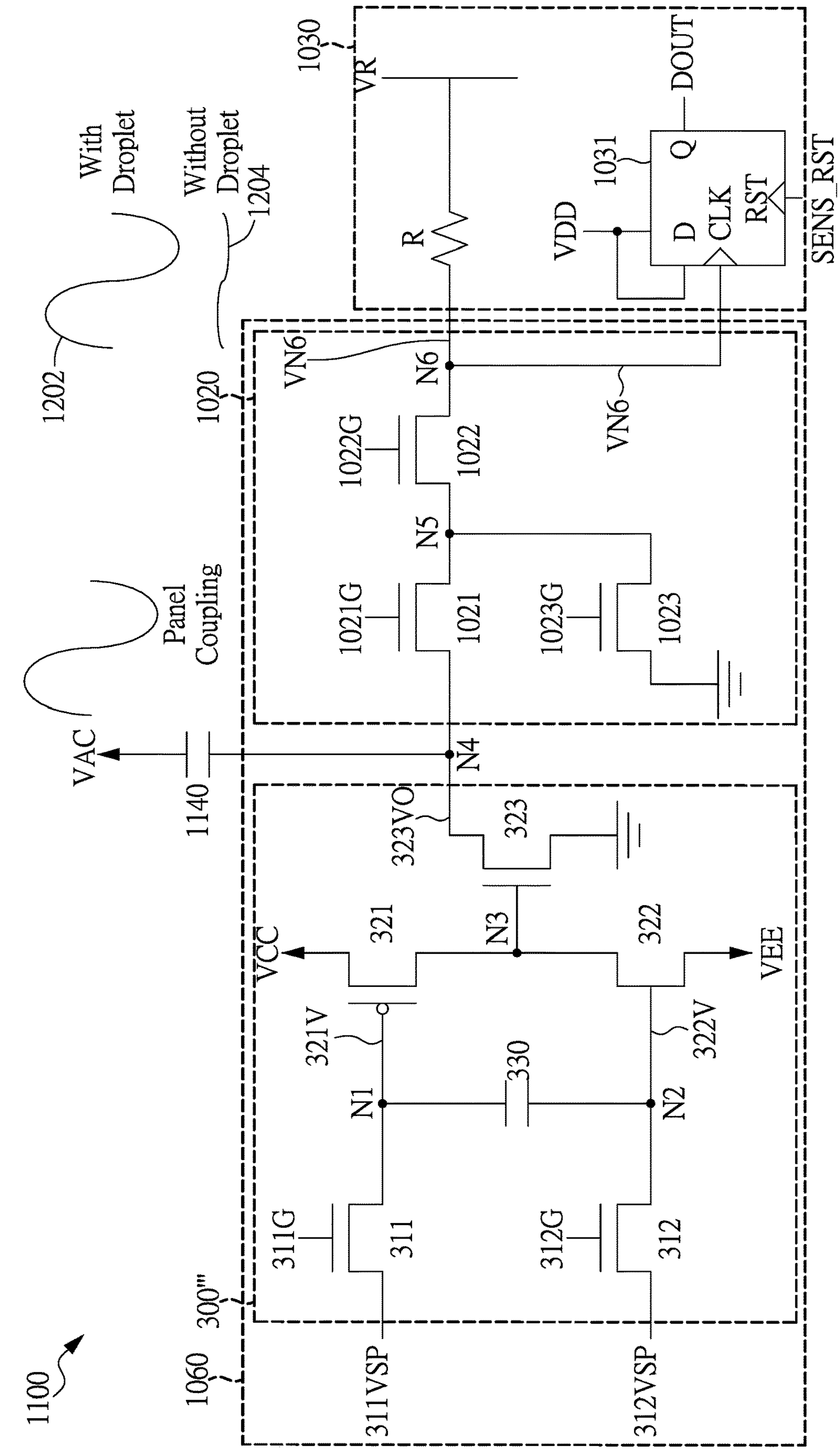
FIG. 12 is a diagram showing the voltage amplitude at node N6 with different droplet conditions in accordance with the embodiment of FIG. 11.

FIG. 12 is a schematic diagram of the AM-EWOD driving system 1100 showing the voltage amplitude at node N6 with different droplet conditions in accordance with the embodiment of FIG. 11.

Figure 13A:
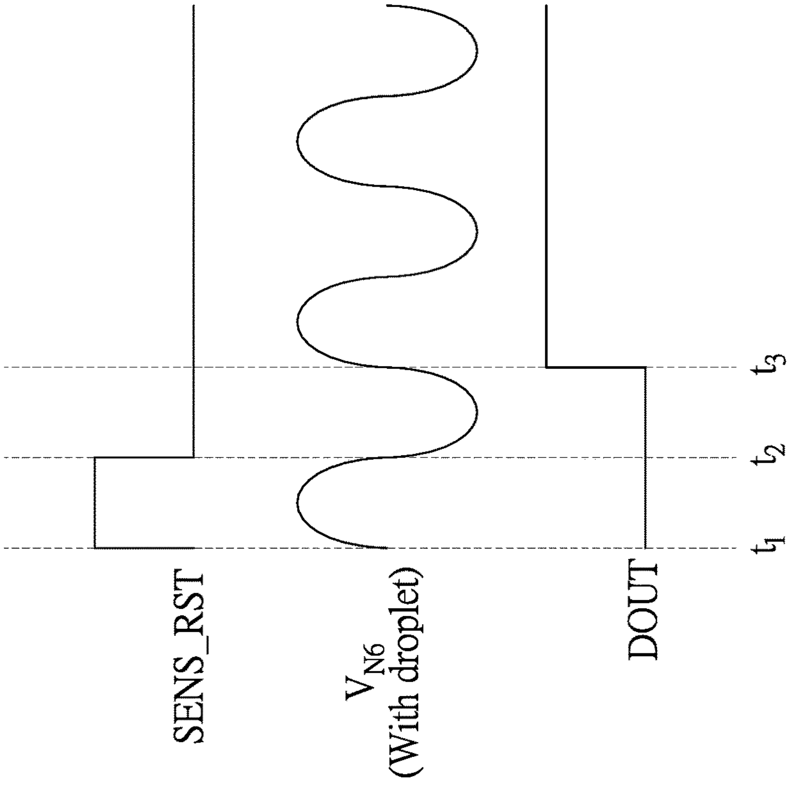
FIGS. 13A-13B are waveform diagrams illustrating the reset signal SENS_RST, the voltage at node N6, and the output data signal of the D flip-flop in accordance with the embodiment of FIG. 12.
Figure 13B:
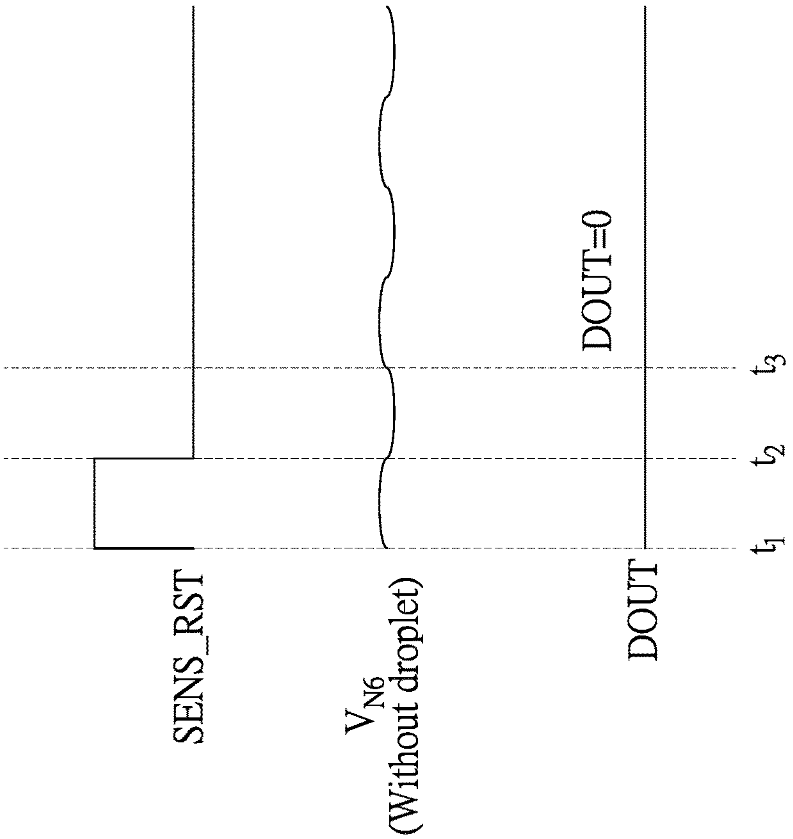

FIGS. 13A-13B are waveform diagrams illustrating the reset signal SENS_RST, the voltage at node N6, and the output data signal of the D flip-flop in accordance with the embodiment of FIG. 12.

In another embodiment, the AM-EWOD driving system 1000 is not only capable of controlling movement of the droplet therein, but also capable of detecting the position and temperature of the droplet. Controlling the movement of the droplet and detecting its position and temperature may be necessary for a PCR (Polymerase Chain Reaction) procedure. In an embodiment, the AM-EWOD driving system 1000 may include a pixel electrode circuit 300", a detection control circuit 1020, a position detection circuit 1030, a temperature detection circuit 1040, and a heating circuit 1050. For brevity, the position detection circuit 1030 and the temperature detection circuit 1040 are illustrated as blocks in FIG. 10, and the details thereof are described in the embodiments of FIGS. 12-14. In addition, for purposes of description, the pixel electrode circuit 300" may be similar to the pixel electrode circuit 300 shown in FIG. 3, but any of the pixel electrode circuits described in the embodiments of FIGS. 2 and 4-8 can be used as well. For example, the output terminal (i.e., node N4) of the pixel electrode circuit 300' may be coupled to the detection control circuit 1020.

In some embodiments, the detection control circuit 1020 may be integrated with each of the pixel electrodes 121 of the AM-EWOD driving system 100 shown in FIG. 1A. The position detection circuit 1030 and the temperature detection circuit 1040 may be arranged outside each of the pixel electrodes 121 of the AM-EWOD driving system 100 shown in FIG. 1A. In some other embodiments, the detection control circuit 1020 may be disposed outside each of the pixel electrodes 121 shown in FIG. 1A. For purposes of description, the pixel electrode circuit 300' and the detection control circuit 1020 may be collectively regarded as a pixel circuit 1060.

The detection control circuit 1020 may be configured to control the detection mode of the AM-EWOD driving system 1000, and may include transistor 1021, transistor 1022, and transistor 1023.

The transistor 1021 may be a switch controlled by a position selection signal 1021G, and may have a first terminal connected to the output terminal (i.e., node N4) of the pixel electrode circuit 300', and a second terminal connected to node N5. The transistor 1022 may be a switch controlled by a control signal 1022G, and may have a first terminal connected to node N5, and a second terminal connected to node N6. Node N6 may be connected to the position detection circuit 1030 and the temperature detection circuit 1040. The transistor 1023 may be a switch controlled by a temperature selection signal 1023G, and may have a first terminal connected to node N5, and a second terminal connected to the ground.

The heating circuit 1050 may include transistors 1051 and 1052, a capacitor 1053, and a heating resistor 1054. The transistors 1051 and 1052 may be used for the heating function of the AM-EWOD driving system 1000. The heating transistor 1051 may be a switch controlled by the control signal 1051G. The heating transistor 1051 may have a first terminal connected to the input voltage 1051VSH, and a second terminal connected to node N7. The capacitor 1053 is coupled between node N7 and the ground. The transistor 1052 may have a gate coupled to node N7, a terminal (such as a drain) coupled to the heating resistor 1051, and a terminal (such as a source) coupled to the ground.

When the AM-EWOD driving system 1000 enters a heating mode, the input voltage 1051VSH and the control signal 1051G may be in the high logic state. At this time, the heating transistor 1051 is turned on. The input voltage 1051VSH may be stored in the capacitor 1053. The node N7 may be also in the high logic state. Thus, the transistor 1052 is turned on, and a current generated from the transistor 1052 may flow through the heating resistor 1054 to the ground to start generating heat on the heating resistor 1054.

Referring to FIG. 11, the detailed schematic diagram of the position detection circuit 1030 is illustrated. In one embodiment, the position detection circuit 1030 may include a D flip-flop 1031 and a resistor R. The D flip-flop 1031 may have a data terminal D, an input clock terminal CLK, a reset terminal RST, and an output terminal Q. The data terminal D may be connected to the power supply voltage VDD, and the input clock terminal CLK may be connected to node N6, and the reset terminal may receive an asynchronous reset signal SENS_RST.

When the AM-EWOD driving system 1100 enters a position detection mode, the voltage at node N3 may be in the low logic state (i.e., a relatively low voltage) to turn off the transistor 323, and thus the output terminal (i.e., node N4) of the pixel electrode circuit 300' may be floating. In such a condition, the voltage 323VO at node N4 may follow the voltage signal VAC (i.e., an AC voltage signal) due to the coupling effect. The node N4 is coupled to a top plate electrode through the equivalent capacitance 1140. The equivalent capacitance 1140 is arranged between the pixel electrode circuit 300" and a top plate electrode of the AM-EWOD driving system 100, as described in the embodiment of FIG. 1A. The amplitude of the voltage 323VO may be determined by the equivalent capacitance 1140.

If a droplet exists between the pixel electrode circuit 300" and a top plate electrode, the equivalent capacitance 1140 will be larger, and the amplitude of the coupled voltage signal at node N4 will also be higher. In such a condition, the coupled voltage signal at node N4 may be substantially the same as the voltage signal VAC. Referring to FIG. 12, the curve 1202 shows the change of the coupled voltage signal at node N6 with a droplet existing between the pixel electrode circuit 300' and a top plate electrode.

If no droplet 130 exists between the pixel electrode circuit 300' and a top plate electrode, the equivalent capacitance 1140 will be lower, and the amplitude of the coupled voltage signal at node N4 will also be lower. In such a condition, the coupled voltage signal at node N4 may be very low. Referring to FIG. 12, the curve 1204 shows the change of the coupled voltage signal at node N6 without a droplet existing between the pixel electrode circuit 300' and a top plate electrode.

In one embodiment, when the AM-EWOD driving system 1100 enters the position detection mode, both the position selection signal 1021G and the control signal 1022G are in the high logic state, and the temperature selection signal 1023G is in the low logic state. The transistors 1021 and 1022 are turned on, and the transistor 1023 is turned off. In addition, the asynchronous reset signal SENS_RST may be asserted to initialize or reset the output data signal DOUT (e.g., DOUT is reset to 0) at the output terminal Q of the D flip-flop 1031. In such a condition, nodes N4 and N6 may be substantially the same node, and the voltage at node N6 may be fed to the input clock terminal CLK of the D flip-flop 1031.

In the first case, when a droplet exists between the pixel electrode circuit 1010 and the top plate electrode, it indicates that the equivalent capacitance 1140 may be higher, and the amplitude of the voltage VN6 at node N6 may also be higher, as shown by curve 1202 in FIG. 12.

In the second case, when no droplet 130 exists between the pixel electrode circuit 1010 and the top plate electrode 110, it indicates that the equivalent capacitance CD may be smaller, and the amplitude of the voltage VN6 at node N6 may also be lower, as shown by curve 1204 in FIG. 12.

In one embodiment, the voltage VN6 at node N6 is fed into the input clock terminal CLK of the D flip-flop 1031. The D flip-flop 1031 will be triggered by a rising edge (or a falling edge) of the voltage VN6 if the amplitude of the voltage VN6 is sufficiently high (e.g., being equal to or higher than the trigger voltage of the high logic state of the D flip-flop 1031).

Referring to FIG. 13A, in the first case, the amplitude of the voltage VN6 at node N6 may be equal to or higher than the voltage of the high logic state of the D flip-flop 1031. Upon initialization of the position detection circuit 1030, the asynchronous reset signal SENS_RST is asserted to the high logic state at time t1 to reset output data signal DOUT at the output terminal Q of the D flip-flop 1031, and the output data signal DOUT is kept at the low logic state. When the asynchronous reset signal SENS_RST is de-asserted to the low logic state at time t2, the D flip-flop 1031 may start working normally. Because the amplitude of the voltage VN6 may be sufficiently high, the rising edge of the voltage VN6 may trigger the D flip-flop 1031 at time t3, and the output data signal DOUT at the output terminal Q will follow the input of the data terminal D, which is the high logic state (i.e., logic 1).

Referring to FIG. 13B, in the second case, the amplitude of the voltage VN6 at node N6 may be lower than the trigger voltage of the high logic state of the D flip-flop 1031. Upon initialization of the position detection circuit 1030, the asynchronous reset signal SENS_RST is asserted to the high logic state at time t1 to reset output data signal DOUT at the output terminal Q of the D flip-flop 1031, and the output data signal DOUT is kept at the low logic state. When the asynchronous reset signal SENS_RST is de-asserted to the low logic state at time t2, the D flip-flop 1031 may start working normally. Because the amplitude of the voltage VN6 may not be sufficiently high, the rising edge of the voltage VN6 will not trigger the D flip-flop 1031 at time t3, and the output data signal DOUT at the output terminal Q will be kept at the low logic state (i.e., logic 0).

Figure 14:
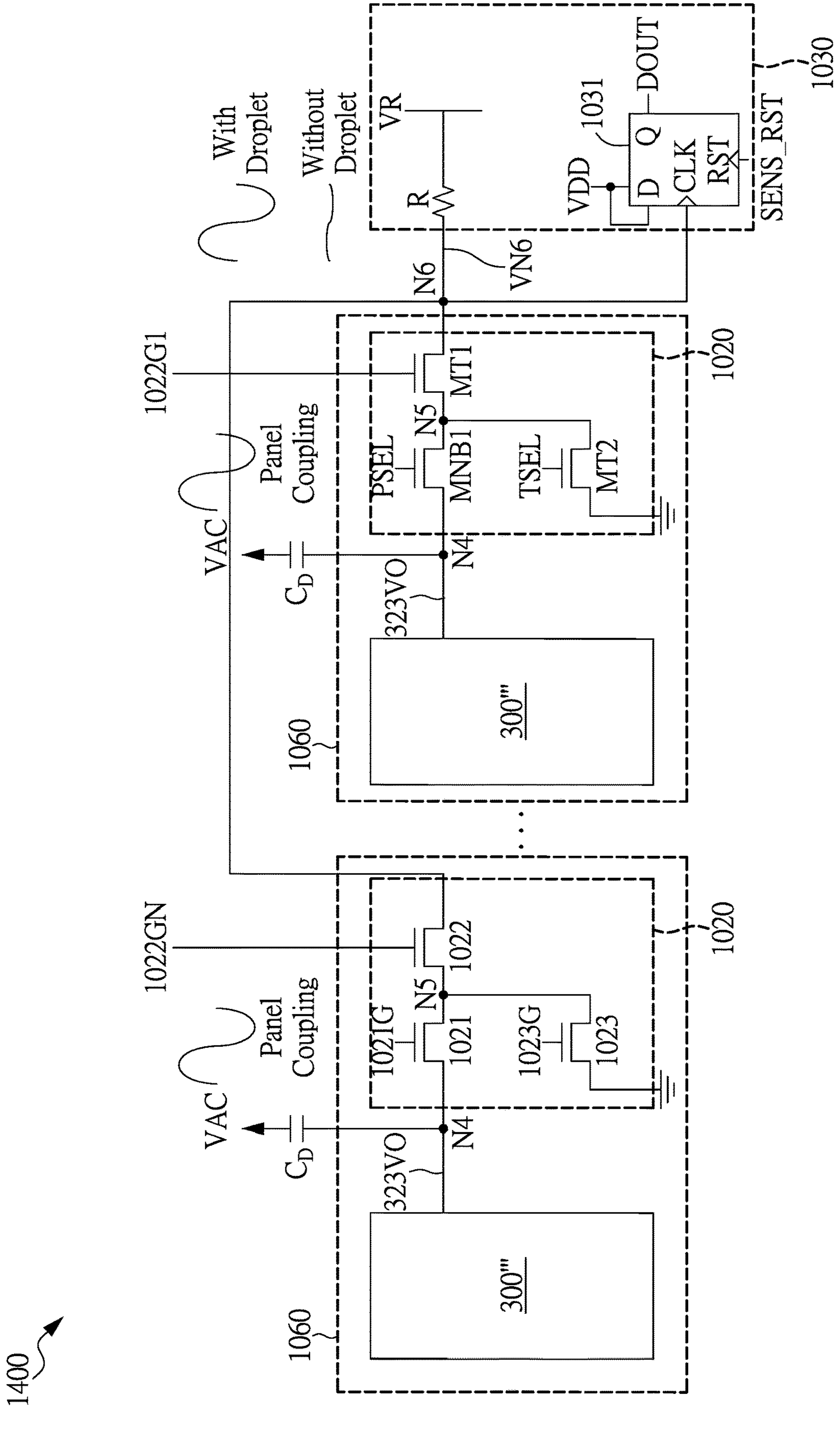
FIG. 14 is a schematic diagram of an AM-EWOD driving system 1400 equipped with a position detection circuit 1030 in accordance with an embodiment of the present disclosure.

FIG. 14 is a schematic diagram of an AM-EWOD driving system 1400 equipped with a position detection circuit 1030 in accordance with an embodiment of the present disclosure.

Figure 15:
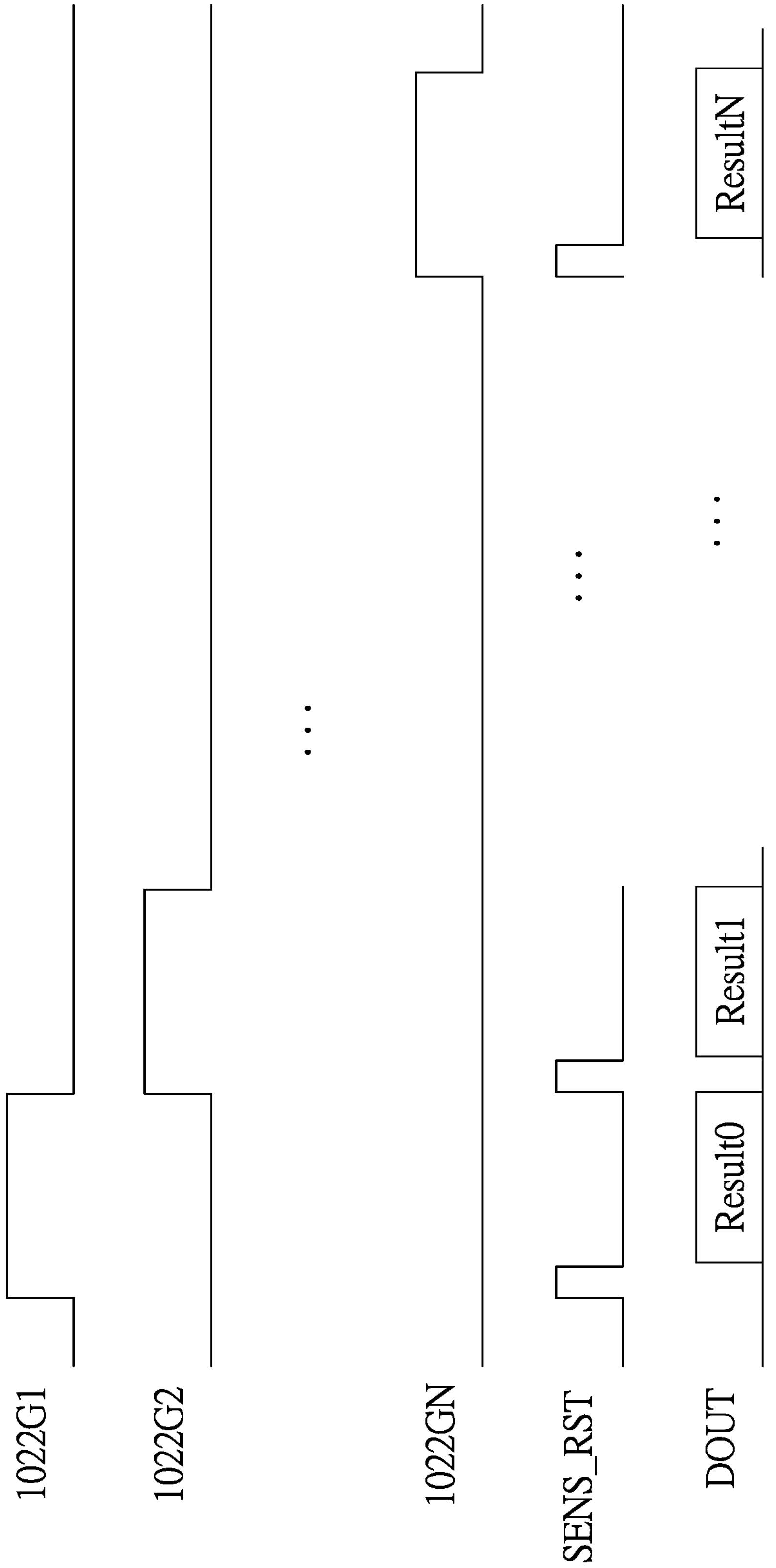
FIG. 15 is a waveform diagram illustrating the timing of position detection operations of the pixel circuit 1060 in the same row in accordance with the embodiment of FIG. 14.

FIG. 15 is a waveform diagram illustrating the timing of position detection operations of the pixel circuit 1060 in the same row in accordance with the embodiment of FIG. 14.

Referring to FIG. 1B, the pixel electrodes 121 may be arranged in a two-dimensional array of M rows*N columns. The technique described in the embodiment of FIG. 10 can be applied to the pixel electrodes 121 in the same row. Each of the pixel electrodes 121 in the same row may be implemented using the pixel circuit 1060 shown in FIG. 10. The pixel circuit 1060 in the same row may share the same position detection circuit 1030, as shown in FIG. 14. Since there are N pixel circuits 1060 in each row, the control signal 1022G provided to the detection control circuits 1020 may be respective control signals such as 1022G1, 1022G2, 1022G3, . . . , 1022GN, wherein the control signals 1022G1 to 1022GN may be generated by a control circuit (not shown) external to the pixel electrodes 121. In some embodiments, the control circuit may be a microcontroller unit (MCU), but the present disclosure is not limited thereto.

Referring to FIG. 15, in some embodiments, the control circuit may assert the control signals 1022G1 to 1022GN one by one in sequence, such as from the control signal 1022G1 (i.e., in the right most pixel electrode circuit) to the control signal 1022GN in sequence, but the present disclosure is not limited thereto. Referring to FIG. 14, when the AM-EWOD driving system 1400 enters the position detection mode, one of the pixel circuit 1060 is activated at one time, and the transistor 1022 in the activated pixel circuit 1060 is turned on, so the voltage 323VO at node N4 of the activated pixel electrode circuit 300' can be transferred to node N6. Then, the D flip-flop 1031 in the position detection circuit 1030 is reset by the asynchronous reset signal SENS_RST, and the position detection circuit 1030 can work normally to determine whether a droplet 130 exists at the location of the activated pixel circuit 1060. Therefore, after activating the control signals 1022G1 to 1022GN of the pixel electrode circuits 300' one by one, if a droplet 130 exists in the row on which the pixel circuit 1060 are disposed, the position of the droplet 130 can be determined by way of the operations described in the embodiments of FIGS. 10-13.

In one embodiment, if the output data signal DOUT at the output terminal Q of the D flip-flop 1031 is logic 1, it can be determined that a droplet 130 exists between the activated pixel circuit 1060 and the top plate electrode. In addition, if the output data signal DOUT (e.g., Result0 to ResultN) at the output terminal Q of the D flip-flop 1031 is logic 0, it can be determined that no droplet 130 exists between the activated pixel circuit 1060 and the top plate electrode 110.

Figure 16:
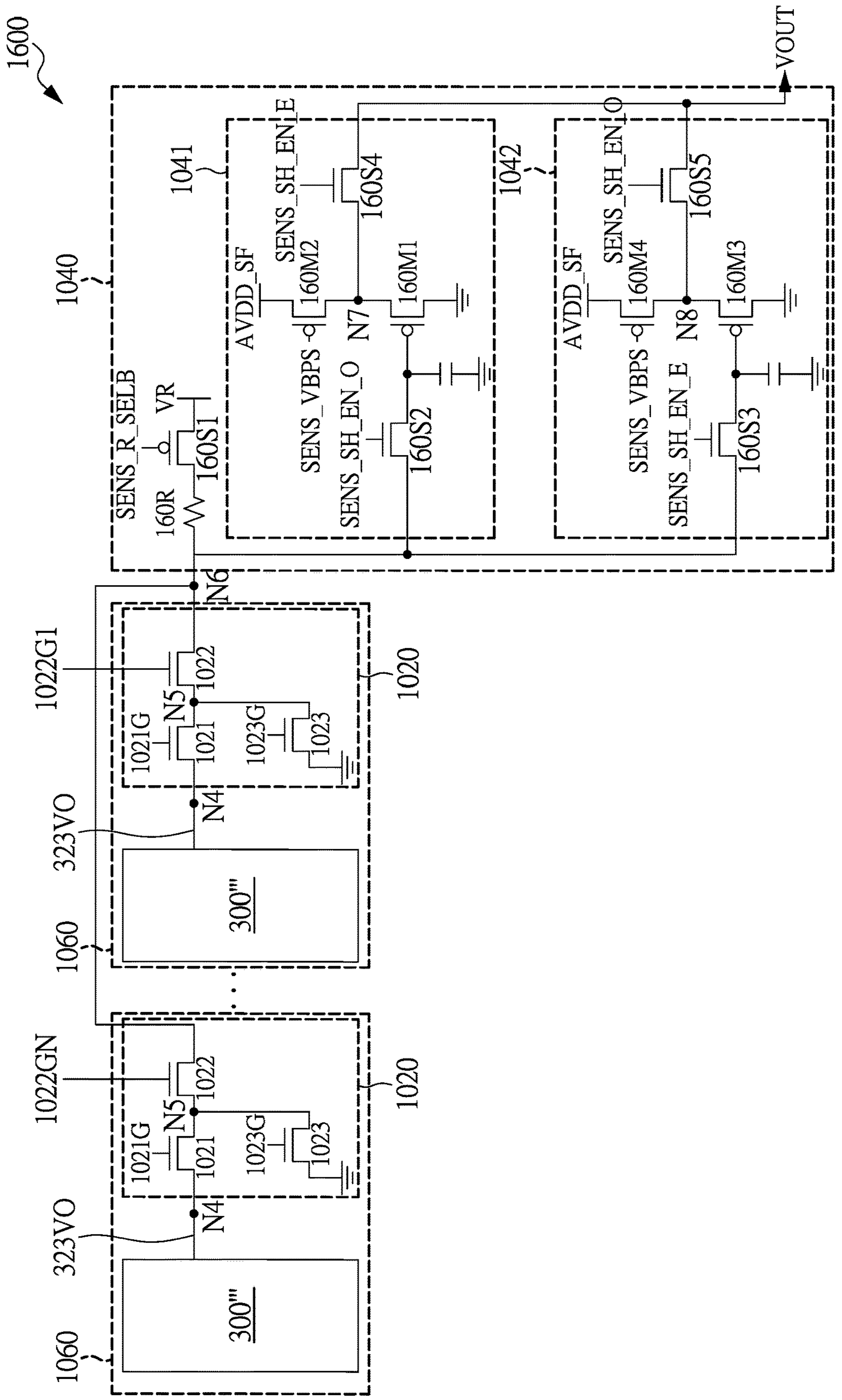
FIG. 16 is a schematic diagram of an AM-EWOD driving system 1600 equipped with a temperature detection circuit 1040 in accordance with an embodiment of the present disclosure.

FIG. 16 is a schematic diagram of an AM-EWOD driving system 1600 equipped with a temperature detection circuit 1040 in accordance with an embodiment of the present disclosure.

Figure 17:
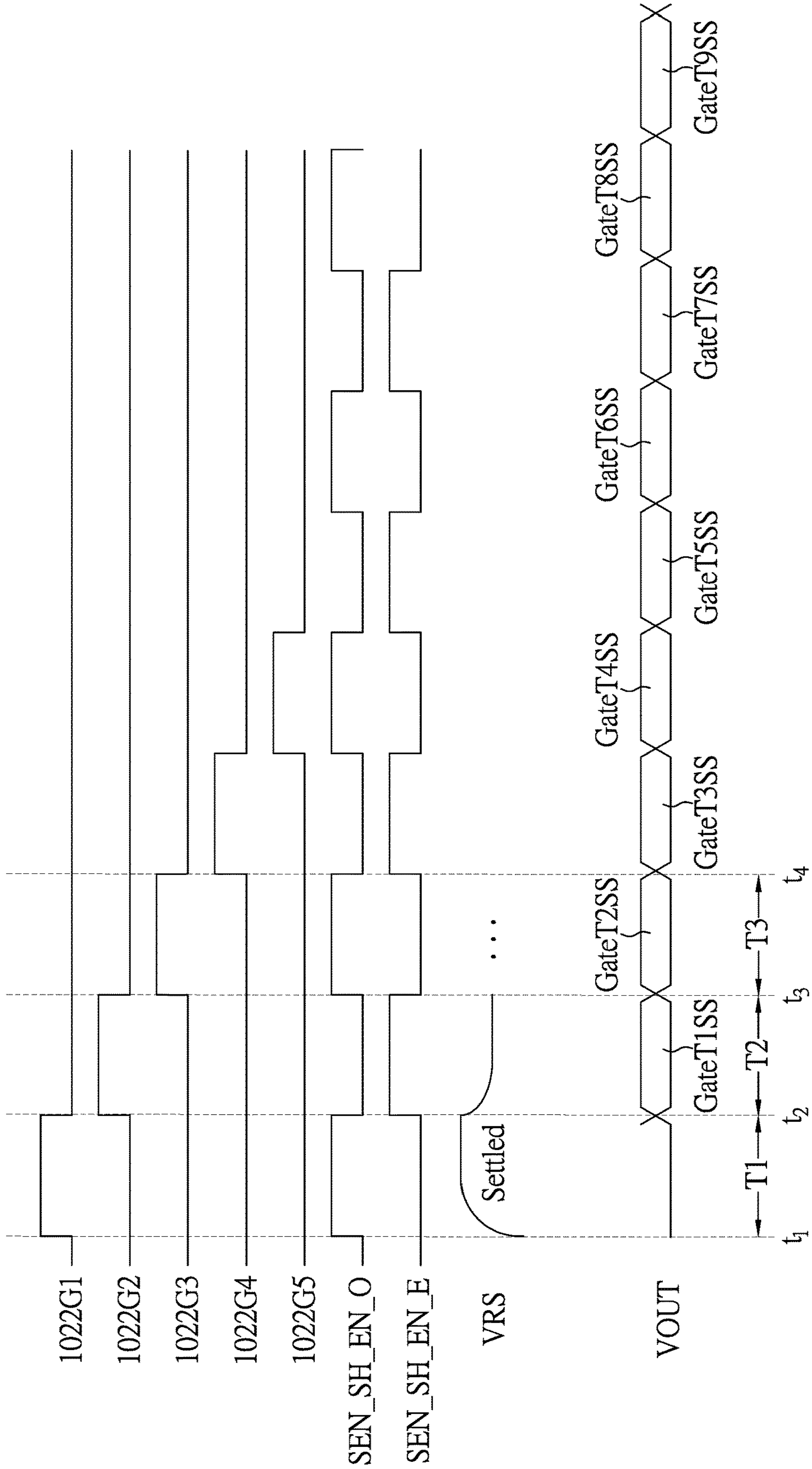
FIG. 17 is a waveform diagram illustrating the timing of position detection operations of the pixel circuit 1060 in the same row in accordance with the embodiment of FIG. 16.

FIG. 17 is a waveform diagram illustrating the timing of position detection operations of the pixel circuit 1060 in the same row in accordance with the embodiment of FIG. 16.

The AM-EWOD driving system 1600 in FIG. 16 may be similar to the AM-EWOD driving system 1400, with the difference therebetween that the AM-EWOD driving system 1600 may include a temperature detection circuit 1040 to detect the temperature of the droplet.

Referring to FIG. 16, the pixel circuit 1060 in the same row may share the same temperature detection circuit 1040. Since there are N pixel circuits 1060 in each row, the control signal 1022G provided to the detection control circuits 1020 may be respective control signals such as 1022G1 to 1022GN, wherein the control signals 1022G1 to 1022GN may be generated by a control circuit (not shown) external to the pixel electrodes. In some embodiments, the control circuit may be a microcontroller unit (MCU), but the present disclosure is not limited thereto.

In an embodiment, the temperature detection circuit 1040 may include a first source follower 1041 and a second source follower 1042. In one embodiment, the temperature detection circuit 1040 may include switch transistors 160S1, 160S2, 160S3, 160S4, 160S5, transistors 160M, 160M2, 160M3, 160M4, and a resistor 160R.

The switch transistor 160S1 may be controlled by a low-active control signal SENS_R_SELB. When the control signal SENS_R_SELB is in the low logic state, the voltage at node N6 can be read out through the resistor 160R. The control signals SENS_SH_EN_O and SENS_SH_EN_E may be in complementary logic states. In one embodiment, when SENS_SH_EN_O=1, SENS_SH_EN_E=0. In a further embodiment, when SENS_SH_EN_O=0, SENS_SH_EN_E=1.

The control signals SENS_SH_EN_O and SENS_SH_EN_E may be used to sample the voltage at node N6 of the activated pixel circuit 1060, and to output the previously sampled voltage as the output voltage VOUT.

In one embodiment, the first source follower 1041 may include the transistors 160M1 and 160M2. The input of the first source follower 1041 (i.e., the gate of the transistor 160M1) may be controlled by the control signal SENS_SH_EN_O. The output terminal (i.e., node N7) of the first source follower 1041 may be controlled by the control signal SENS_SH_EN_E.

The second source follower 1042 may include the transistors 160M3 and 160M4 The input of the second source follower 1042 (i.e., the gate of the transistor 160M3) may be controlled by the control signal SENS_SH_EN_E. The output terminal (i.e., node N8) of the second source follower 1042 may be controlled by the control signal SENS_SH_EN_O.

In some embodiments, the output voltage VOUT may be sent to an external pad that may have a heavy load. It may take some settle time for the first source follower 1041 or the second source follower 1042 to sample the voltage at node N6. It may also take some settle time to send the output voltage VOUT to the external pad due to the heavy load.

The first source follower 1041 and the second source follower 1042 may sample the voltage at node N6 and output the previously sampled voltage in an alternating fashion. In some embodiments, when SENS_SH_EN_O=1 and SENS_SH_EN_E=0, the switch transistor 160S2 is closed, and the switch transistor 160S4 is opened. The first source follower 1041 may be used to sample the voltage at node N6, and the second source follower 1042 may be used to output the previously sampled voltage as the output voltage VOUT.

When SENS_SH_EN_O=0 and SENS_SH_EN_E=1, the switch transistor 160S3 is closed, and the switch S5 is opened. The second source follower 1042 may be used to sample the voltage at node N6, and the first source follower 1041 may be used to output the previously sampled voltage as the output voltage VOUT.

Referring to FIG. 17, in some embodiments, the control circuit may assert the control signals 1022G1 to 1022GN one by one in sequence, such as from the control signal 1022G1 (i.e., in the right most pixel electrode circuit) to the control signal 1022GN in sequence, but the present disclosure is not limited thereto.

When the position selection signal PSEL is in the low logic state (i.e., logic 0) and the temperature selection signal TSEL is in the high logic state (i.e., logic 1), the transistor MNB1 in each pixel circuit 1060 is turned off, and the transistor MT2 in each pixel circuit 1060 is turned on, and the AM-EWOD driving system 1600 will enter the position detection mode.

When the AM-EWOD driving system 1600 has entered the position detection mode, the sampling operation and the output operation may be pipelined using the first source follower 1041 and the second source follower 1042.

Referring to FIGS. 16 and 17, upon entering the position detection mode, the control signal 1022G1 is asserted at time t1. At time t1, the pixel circuit 1060 controlled by the control signal 1022G1 is activated, and the transistor 1022 in the activated pixel circuit 1060 controlled by the control signal 1022G1 is turned on. In such a condition, the control signal SENS_SH_EN_O is in the high logic state, and the control signal SENS_SH_EN_E is in the low logic state. The first source follower 1041 may be used to sample the voltage at node N6, and the second source follower 1042 may be used to output the previously sampled voltage as the output voltage VOUT.

The voltage VRS shown in FIG. 17 may refer to the voltage at node N7 of the first source follower 1041 or node N8 of the second source follower 1042. It may take some time to fully sample the voltage at node N6, and the voltage VRS may gradually increase to the voltage at node N6 after some time, as shown in FIG. 17. It should be noted that the output voltage VOUT output by the second source follower 1042 may be valid during the interval T1 between times t1 and t2 because the first sensor data of the voltage at node N6 is not sampled yet. That is, the previously sample voltage for the second source follower 1042 is not available in such a condition. Thus, the output voltage VOUT during the interval T1 will be ignored.

At time t2, the control signal 1022G1 is de-asserted, and the control signal 1022G2 is asserted. Thus, the transistor 1022 in the activated pixel circuit 1060 controlled by the control signal 1022G2 is turned on, and the control signal SENS_SH_EN_O is in the low logic state, and the control signal SENS_SH_EN_E is in the high logic state. In such a condition, the second source follower 1042 may be used to sample the voltage at node N6, and the first source follower 1041 may be used to output the previously sampled voltage as the output voltage VOUT, which is shown by the sensor signal GateT1SS in FIG. 17. Here, GateT1SS denotes the sensor signal (i.e., sampled voltage) of 1022G1-controlled pixel circuit 1060, and GateT2SS denotes the sensor signal of 1022G2-controlled pixel circuit 1060, and so on. For brevity, the voltage VRS at node N8 of the second source follower 1042 is not shown in FIG. 17.

Similarly, at time t3, the control signal GateT3 is asserted, and the control signal GateT2 is de-asserted. Thus, the transistor 1022 in the activated pixel circuit 1060 controlled by the control signal 1022G3 is turned on, and the control signal SENS_SH_EN_O is in the high logic state, and the control signal SENS_SH_EN_E is in the low logic state. In such a condition, the first source follower 1041 may be used to sample the voltage at node N6, and the second source follower 1042 may be used to output the previously sampled voltage as the output voltage VOUT, which is shown by the sensor signal GateT2SS in FIG. 17. In the subsequent clock cycles, the operations of the AM-EWOD driving system 1600 can be performed in a similar manner. It should be noted that the AM-EWOD driving system 1400 in FIG. 14 and the AM-EWOD driving system 1600 in FIG. 16 can be integrated into an AM-EWOD driving system equipped with the position detection circuit 1030 and the temperature detection circuit 1040.

Figure 18:
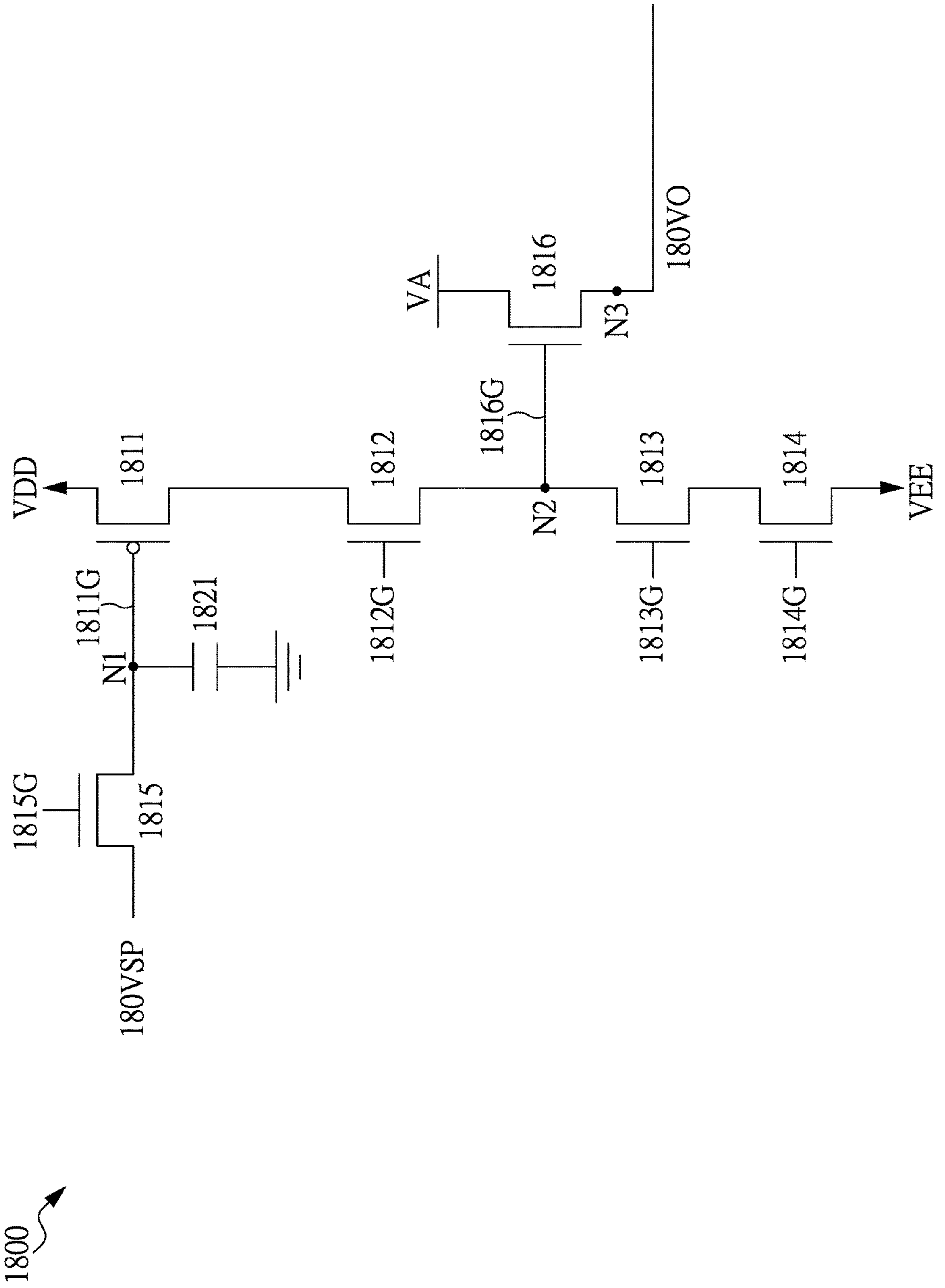
FIG. 18 is a schematic diagram of a pixel electrode circuit 1800 in accordance with yet another embodiment of the present disclosure.

FIG. 18 is a schematic diagram of a pixel electrode circuit 1800 in accordance with yet another embodiment of the present disclosure.

Design of the pixel electrode circuit 1800 may ensure that the voltage 180VO at the output terminal of the pixel electrode circuit 1800 can have enough voltage swing range and all transistors in the pixel electrode circuit 1800 do not suffer wide voltage swing range.

Referring to FIG. 18, the pixel electrode circuit 1800 may include transistors 1811, 1812, 1813, 1814, 1815, 1816, and a capacitor 1821. Bias voltages 1812G, 1813G, 1814G are respectively applied to transistors 1812, 1813 and 1814 and turn on the transistors 1812, 1813, 1814.

In one embodiment, the transistor 1811 is P-type transistor, and the transistors 1812, 1813, 1814, 1815, and 1816 are N-type transistors.

The voltage VA may refer to a common mode voltage of the voltage 180VO. In some embodiments, the voltage VA may be 0V. It should be noted that if the common mode voltage of the voltage 180VO is not equal to VA, a voltage may be applied to the dielectric layer 120 of the AM-EWOD driving system 100 shown in FIG. 1A, resulting in polarization of the dielectric layer 120.

Referring to FIG. 18, in one embodiment, the threshold voltage of the transistor 1812 is Vth. In one embodiment, when the voltage 1811G at node N1 is in the low logic state, the transistor 1811 is turned on, and the voltage at node N2 refers to 1816G. Thus, the voltage difference between the voltages 1816G and VA may be sufficient to turn on the transistor 1816, and thus the voltage 180VO at the output terminal (i.e., node N3) of the pixel electrode circuit 1800 will be pulled down to the voltage VA.

In one embodiment, when the voltage VS at node N1 is in the high logic state, the transistor 1811 is turned off, and the voltage 1816G at node N2 will be pulled down to the power supply voltage VEE. Thus, the transistor 1816 is turned off, and the output terminal (i.e., node N3) of the pixel electrode circuit 1800 may be floating. In this way, the voltage swing range of the voltage 180VO at node N3 may follow the voltage signal VAC of the top plate electrode 110 of the AM-EWOD driving system 100 shown in FIG. 1A, which is between VA−VEE and VA+VEE. Thus, the voltage 180VO may have a wide voltage swing range. In addition, the voltage swing range of the transistor 1816 may be between 0 and VDD, indicating that the transistor 1815 does not suffer from the wide swing range of the voltage 180VO.

Figure 19:
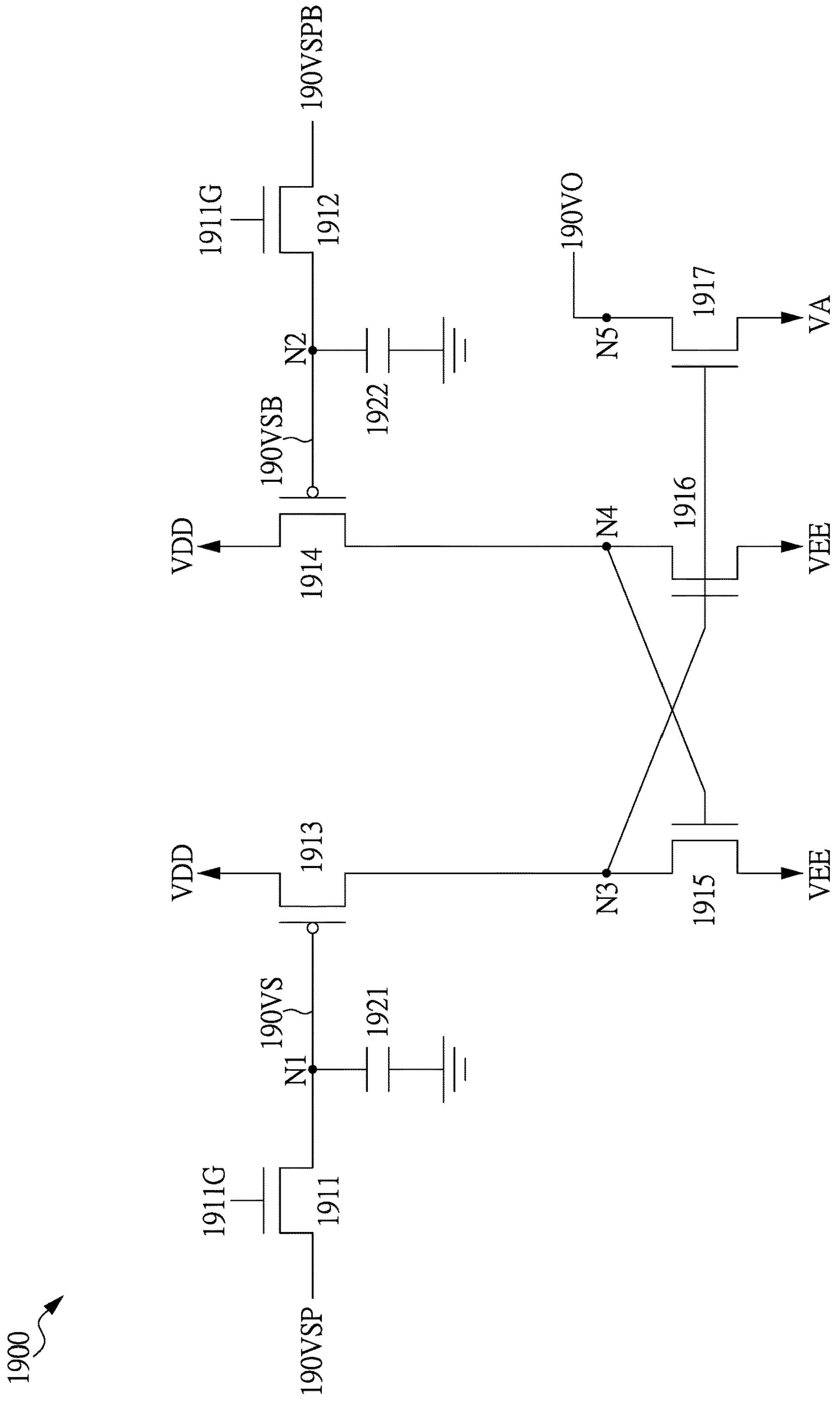
FIG. 19 is a schematic diagram of a pixel electrode circuit 1900 in accordance with yet another embodiment of the present disclosure.

FIG. 19 is a schematic diagram of a pixel electrode circuit 1900 in accordance with yet another embodiment of the present disclosure.

The pixel electrode circuit 1900 may be a latch-type EWOD driving circuit, which includes transistors 1911, 1912, 1913, 1914, 1915, 1916 and 1917, and capacitors 1921 and 1922.

The transistors 1915 and 1916 may form a latch. In one embodiment, the gate of the transistor 1916 may be electrically connected to the drain of the transistor 1915 (i.e., node N3), and the drain of the transistor 1916 may be electrically connected to the gate of the transistor 1915. In addition, the gate of the transistor 1917 may be electrically connected to node N3. It should be noted that the transistor 1917 is driven by the gate voltage of the transistor 1916.

In one embodiment, the input voltages 190VSP and 190VSPB refer to complementary input voltages. While input voltage 190VSP is logic 0, the input voltage 190VSPB is logic 1. While input voltage 190VSP is logic 1, the input voltage 190VSPB is logic 0. The voltage VS at node N1 and the voltage 190VSB at node N2 may be differential signals.

In some embodiments, the input voltages 190VSP and 190VSPB may be from different source driver ICs (not shown in FIG. 19) external to the pixel electrode circuit 1900. Therefore, the transistors 1915-1916 and the transistors 1913-1914 have a voltage swing range between VDD and VEE. In one embodiment, the input voltage 190VSP is in the low logic state and the input voltage 190VSPB is in the high logic state. The voltage 190VS at node N1 is in the low logic state, and the voltage 190VSB at node N2 is in the high logic state. Thus, the transistor 1913 is turned on, and the transistor 1914 is turned off. In such a condition, the drain (i.e., node N3) of the transistor 1915 is pulled up to the power supply voltage VDD, and the voltage at node N3 will turn on the transistor 1917, and the voltage 190VO at the output terminal (i.e., node N5) of the pixel electrode circuit 1900 will be pulled (i.e., up or down) to the voltage VA.

In one embodiment, the input voltage 190VSP is in the high logic state and, and the input voltage 190VSPB is in the low logic state. In the meanwhile, the voltage 190VS at node N1 is in the high logic state, and the voltage 190VSB at node N2 is in the low logic state. In such a condition, the transistor 1913 is turned off, and the transistor 1914 is turned on. The drain (i.e., node N3) of the transistor 1915 may be floating, and the transistor 1917 is turned off. The voltage 190VO at the output terminal (i.e., node N5) of the pixel electrode circuit 1900 may be coupled to the voltage signal VAC of the top plate electrode 110 the AM-EWOD driving system 100 of FIG. 1. The voltage 190VO may have a voltage swing range between VA-VEE and VEE. In other words, the peak to peak value of the voltage swing range of the voltage Vtop is (VA−2*VEE). Therefore, the transistors 1915-1916, 1913-1914, and 1917 may suffer the voltage swing range of VDD-VEE, but they can allow a wider voltage swing range of (VA−2*VEE).

Figure 20:
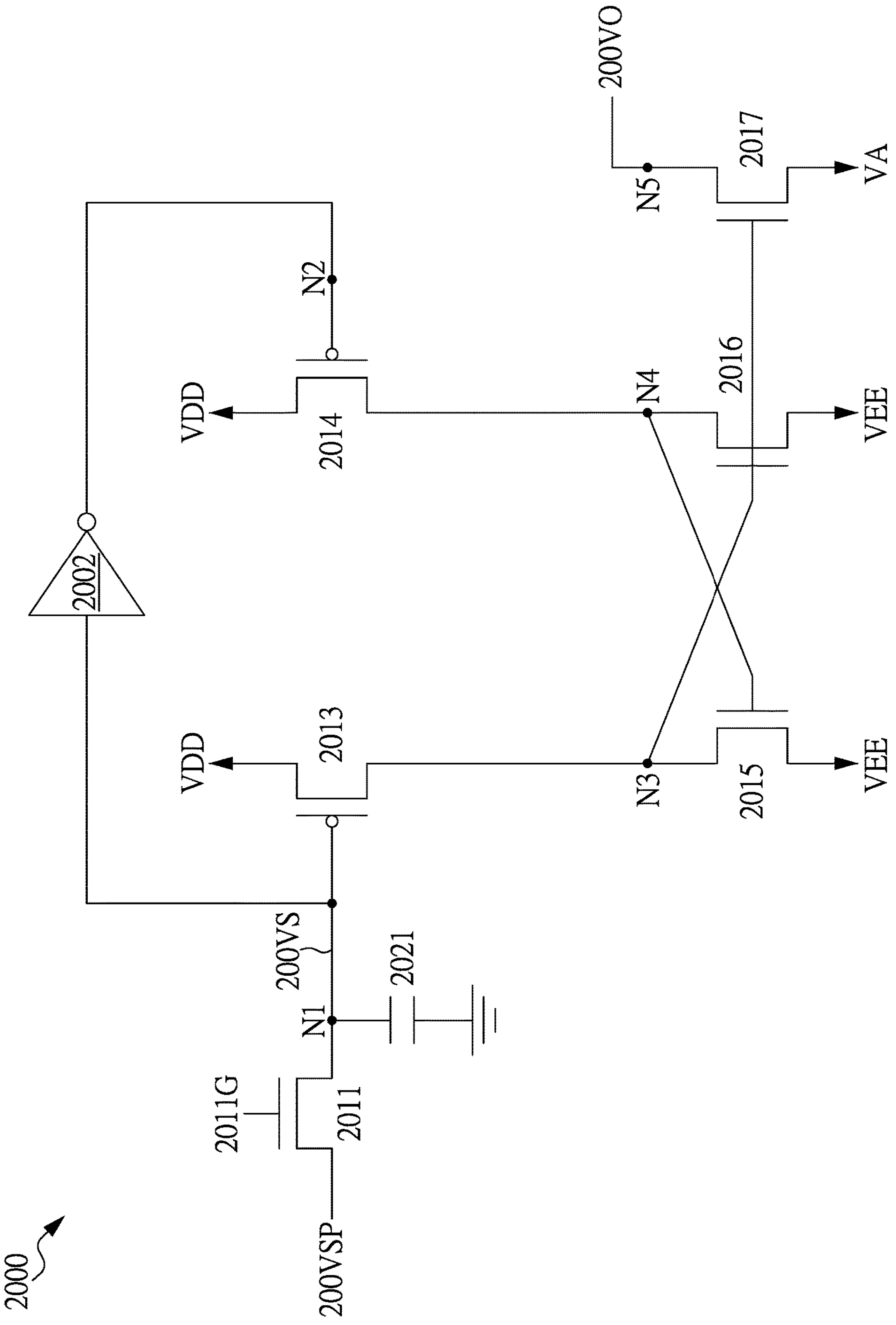
FIG. 20 is a schematic diagram of a pixel electrode circuit 2000 in accordance with yet another embodiment of the present disclosure.

FIG. 20 is a schematic diagram of a pixel electrode circuit 2000 in accordance with yet another embodiment of the present disclosure.

The pixel electrode circuit 2000 shown in FIG. 20 may be similar to the pixel electrode circuit 1900 shown in FIG. 19. Referring to FIG. 20, the input to the gate of the transistor 2014 is from an inverter 2002. The inverter 2002 is coupled between the gates of the transistors 2013 and 2014. Due to the inverter 2002, the input voltages to the gates of the transistors 2013 and 2014 are complementary. The operations of the transistors in the pixel electrode circuit 2000 may be similar to those in the pixel electrode circuit 1900, and thus will not be repeated here. In addition, in comparison with the pixel electrode circuit 1900 in FIG. 19, the pixel electrode circuit 2000 in FIG. 20 may need one external source driver IC and an extra inverter disposed therein. However, the design cost of the pixel electrode circuit 2000 can still be reduced in comparison with the pixel electrode circuit 1900.

Figure 21:
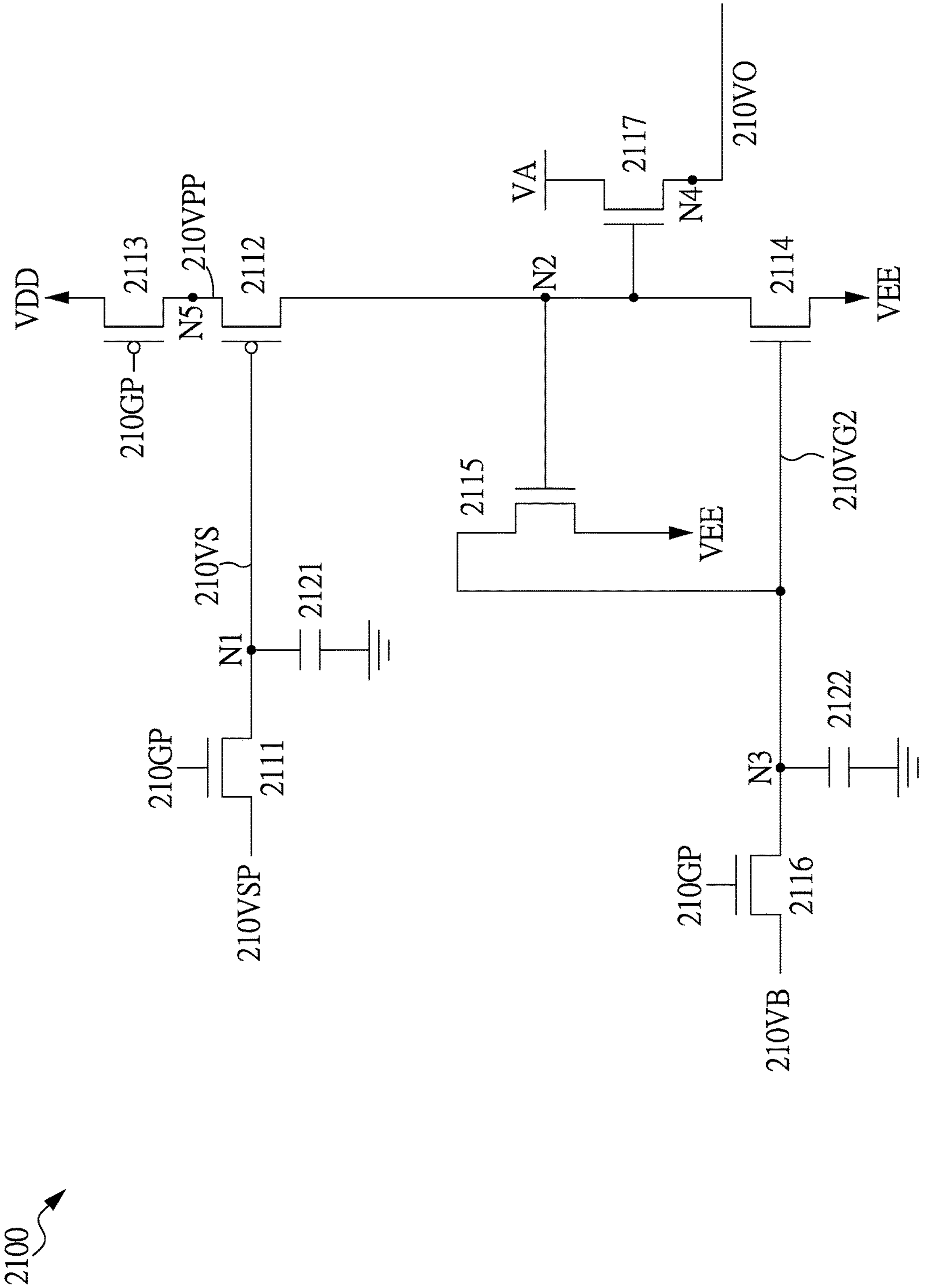
FIG. 21 is a schematic diagram of a pixel electrode circuit 2100 in accordance with yet another embodiment of the present disclosure.

FIG. 21 is a schematic diagram of a pixel electrode circuit 2100 in accordance with yet another embodiment of the present disclosure.

Referring to FIG. 21, the pixel electrode circuit 2100 may include transistors 2111, 2112, 2113, 2114, 2115, 2116 and 2117, and capacitors 2121 and 2122.

For the input voltage 210VSP, the high logic state (i.e., logic 1) may be the power supply voltage VDD, and the low logic state (i.e., logic 0) may be 0V. The transistors 2111, 2113 and 2116 may be controlled by the control signal 210GP. When the control signal 210GP is in the high logic state, the transistors 2111 and 2116 are turned on, and the transistor 2113 is turned off. The voltage 210VS at node N1 may be charged to the input voltage 210VSP through the capacitor 210CSTP. The voltage 210VG2 at node N3 may be charged to the bias voltage 210VB through the capacitor 210CSTP2. When the transistor 2113 is turned off, the transistor 2112 will be turned off no matter how the voltage VS at node N1 is. The transistor 2114 is turned on to pull down the voltage at node N2 to the power supply voltage VEE if VB>>VEE. The transistor 2115 will be turned off since the voltage at node N2 has been pulled down to the power supply voltage VEE. In this case, the transistor 2117 is turned off, and the output terminal (i.e., node N4) of the pixel electrode circuit 2100 may be floating, and the voltage 210VO at node N4 may follow the voltage signal VAC of the top plate electrode 110 of the AM-EWOD driving system 100 of FIG. 1.

When the control signal 210GP is switched to the low logic state, the transistors 2111 and 2116 are turned off, and the transistor 2113 is turned on. Thus, the voltage 210VPP at node N5 will be pulled up to the power supply voltage VDD. If the voltage 210VS at node N1 is already charged to the power supply voltage VDD, the transistor 2112 will be turned off when the voltage 210VG2 at node N3 is already charged to the bias voltage 210VB. Thus, the transistor 2114 is turned on to pull down the voltage at node N1 to the power supply voltage VEE, and the transistor 2117 is turned off, so the output terminal (i.e., node N4) of the pixel electrode circuit 2100 may be floating, and the lower limit of the voltage swing range of the voltage 210VO may be VEE.

If the voltage 210VS at node N1 is 0V (i.e., capacitor 2121 is not charged), the transistor 2112 is turned on. The voltage at node N2 will be pulled up to the power supply voltage VDD. The transistor 2112 will compete with the transistor 2114 while the transistor 2114 is trying to pull down the voltage at node N2 to the power supply voltage VEE. If the pulling-up force of transistor 2112 is stronger than pulling-down force of the transistor 2114, the voltage at node N2 will be pulled up to the power supply voltage VDD. The transistor 2115 is turned on to pull down the voltage 210VG2 at node N3 to the power supply voltage VEE. Then, the transistor 2114 will be turned off. The voltage at node N2 will be pulled up to a voltage higher than the power supply voltage VDD, so the transistor 2117 is turned on to pull up the voltage 210VO at node N4 to the voltage VA. Therefore, the voltage swing range of the voltage Vtop at node N4 may be 2*(VA-VEE).

Figure 22:
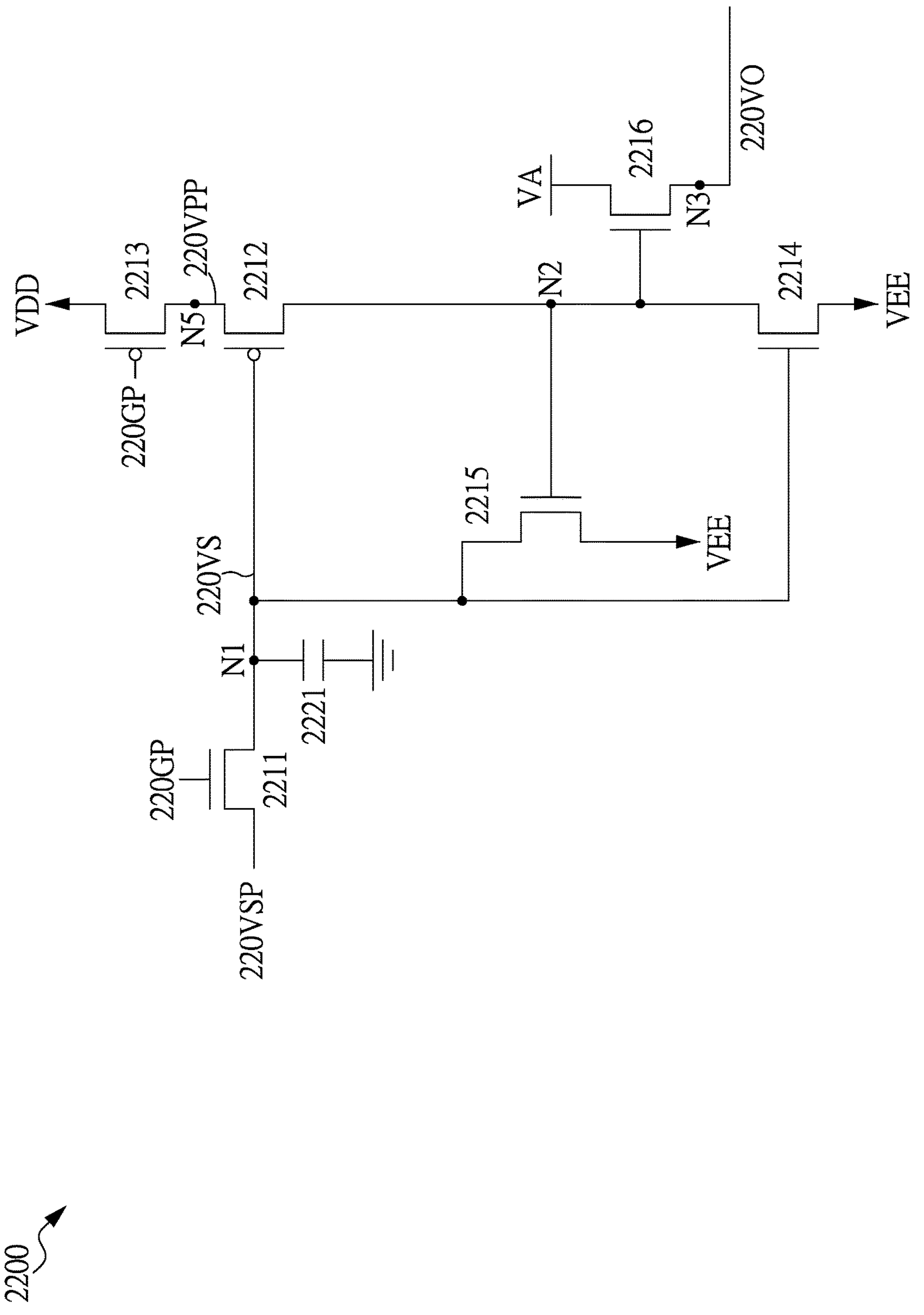
FIG. 22 is a schematic diagram of a pixel electrode circuit 2200 in accordance with yet another embodiment of the present disclosure.

FIG. 22 is a schematic diagram of a pixel electrode circuit 2200 in accordance with yet another embodiment of the present disclosure.

In yet another embodiment, the pixel electrode circuit 2200 may include transistors 2211, 2212, 2213, 2214, 2215 and 2216, and a capacitor 2221. The number of transistors and that of capacitors in the pixel electrode circuit 2200 shown in FIG. 22 are less than that in the pixel electrode circuit 2100 shown in FIG. 21.

When the control signal 220GP is in the high logic state, the transistor 2213 is turned off, and the transistor 2211 is turned on. The voltage 220VS at node N1 will be charged to the input voltage 220VSP, which may be equal to the power supply voltage VDD or 0V. When the input voltage 220VSP=VDD, the voltage 220VS will be charged to the power supply voltage VDD. The transistor 2214 is turned on. The voltage at node N2 is pulled down to the power supply voltage VEE. The transistor 2214 is turned off. The output terminal (i.e., node N3) of the pixel electrode circuit 2200 will be floating.

When the control signal 220GP is switched to the low logic state, the voltage 220VS at node N1 is already charged to the power supply voltage VDD. The transistor 2212 will be turned off, and the transistor 2214 is turned on to keep pulling the voltage at node N1 to the power supply voltage VEE. Therefore, the output terminal (i.e., node N3) of the pixel electrode circuit 2200 will be floating.

When the control signal 220GP is in the low logic state and the input voltage VSP=0V, the voltage VS will be 0V, and the transistors 2212 and 2213 are turned on. The voltage at node N2 will be pulled high to the power supply voltage VDD. However, the transistor 2212 may have to compete with the transistor 2214 which is trying to pull down the voltage at node N2 to the power supply voltage VEE.

The threshold voltage of the transistor 2215 refers to Vth. If the voltage at node N1 is higher than (VEE+Vth), the voltage 220VS will be pulled down to the power supply voltage VEE. During this process, the pulling-up force of the transistor 2212 will increase because the voltage 220VS will decrease. Since the voltage 220VS will decrease, the pulling-down force of the transistor 2214 will decrease. This is positive feedback to increase the force to pull up the voltage at node N1 to the power supply voltage VDD. Therefore, the transistor 2216 will be turned on. The output terminal 220VO at node N3 of the pixel electrode circuit 2200 will be pulled to the voltage VA.

Figure 23:
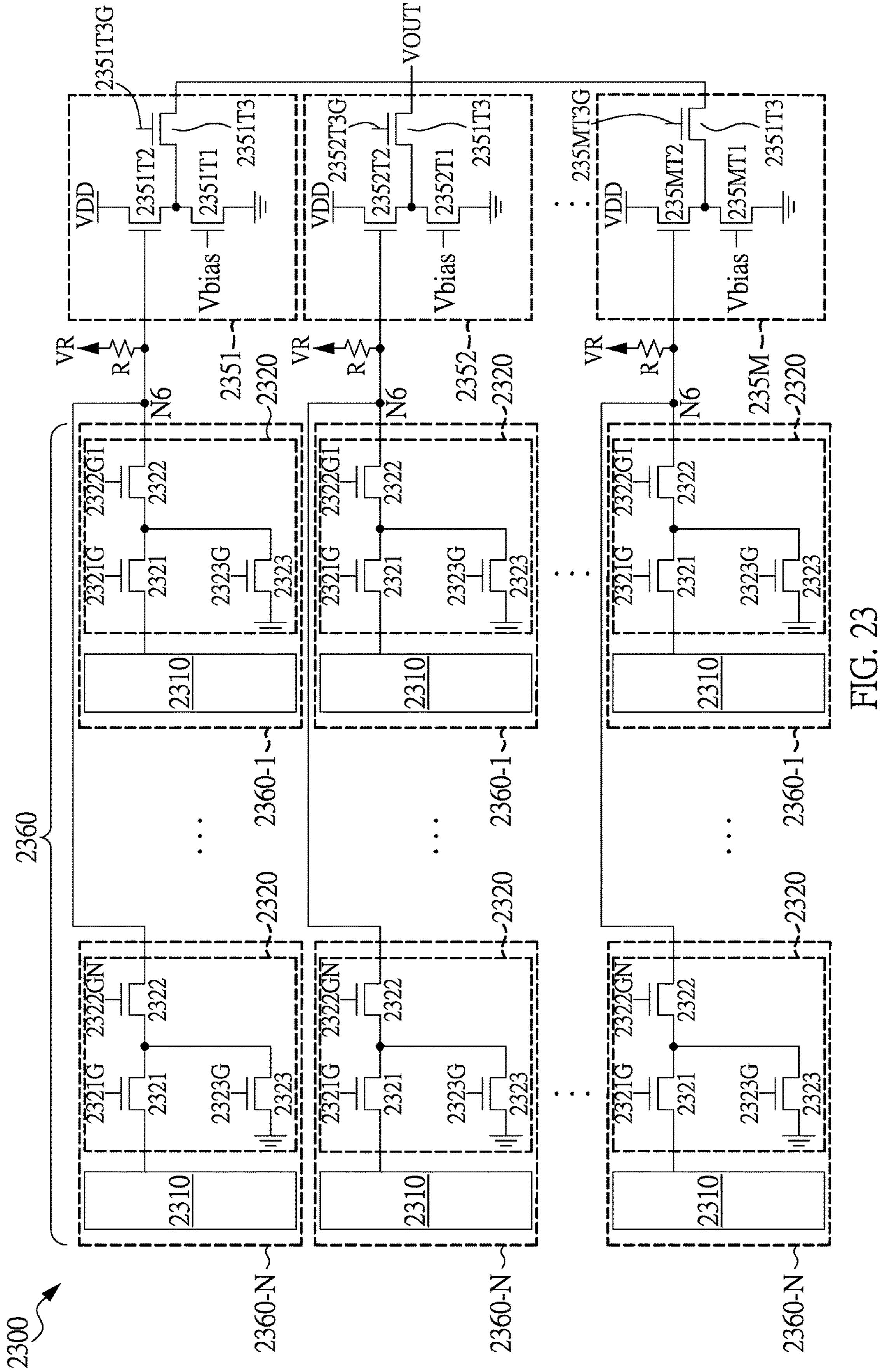
FIG. 23 is a schematic diagram of an AM-EWOD driving system 2300 in accordance with another embodiment of the present disclosure.

FIG. 23 is a schematic diagram of an AM-EWOD driving system 2300 in accordance with another embodiment of the present disclosure.

In the embodiment of FIG. 14, the pixel circuits 1060 may be arranged in a row, and they share the same position detection circuit 1030. The technique described in the embodiment of FIG. 14 can be also applied to the pixel circuits 2360 arranged in a two-dimensional array which includes M rows*N columns, as shown in FIG. 23. The pixel circuits 2360 (e.g., 2360-1 to 2360-N) in each of the rows may share the same source follower. For example, the pixel circuits 2360-1 to 2360-N in the first row may share the source follower 2351, and the output terminal of transistor 2322 in each of the pixel circuits 2360-1 to 2360-N in the first row is connected to node N6 in the first row. The pixel circuits 2360-1 to 2360-N in the second row may share the source follower 2352, and the output terminal of transistor 2322 in each of the pixel circuits 2360-1 to 2360-N in the second row is connected to node N6 in the second row. The pixel circuits 2360-1 to 2360-N in other rows can be arranged in a similar manner.

In addition, there are N pixel circuits 2360 (e.g., 2360-1 to 2360-N) in the same row, and each of the pixel circuits 2360 may include a pixel electrode circuit 2310 and a detection control circuit 2320 which are similar to the pixel electrode circuit and detection control circuit described in the aforementioned embodiments, the details of which are not repeated here. The detection control circuit 2320 in each of the pixel circuits 2360, including pixel circuits 2360-1, 2360-1, . . . , 2360-N, in the same row may be controlled by a respective control signal 2322G1, 2322G2, . . . , 2322GN, and the control signals 2322G1 to 2322GN are activated one by one in sequence.

As an example, source follower 2351 may include two transistors 2351T1, 2351T2 and 2351T3, wherein the transistor 2351T3 may be a switch controlled by a selection signal 2351T3G. When the selection signal 2351T3G is asserted, the source follower 2351 may output the sampled voltage at node N6 as an output voltage VOUT. In addition, a microcontroller unit (MCU) may be used to control the function and speed of the source followers 2351 to 235M. With the assistance of the MCU, sub-sampling on the pixel circuits 2360 can be performed to reduce overall detection time.

It should be noted that the pixel circuits 2360 in the two-dimensional array shown in FIG. 23 may be activated one by one in a predetermined order, such as raster scan. In other words, a specific pixel circuit 2360 in the two-dimensional array is activated at one time, which indicates that the row on which the specific pixel circuit 2360 is located is activated, and the control signal (i.e., e.g., one of the control signals 2322G1 to 2322GN) corresponding to the specific pixel circuit 2360 is asserted. The selection signal corresponding to the activated row is also asserted to output the sampled voltage at node N6 on the activated row as the output voltage VOUT. In addition, an analog-to-digital converter (ADC) may be disposed outside the AM-EWOD driving system 2300 to convert the output voltage VOUT into a digital number.

Figure 24:
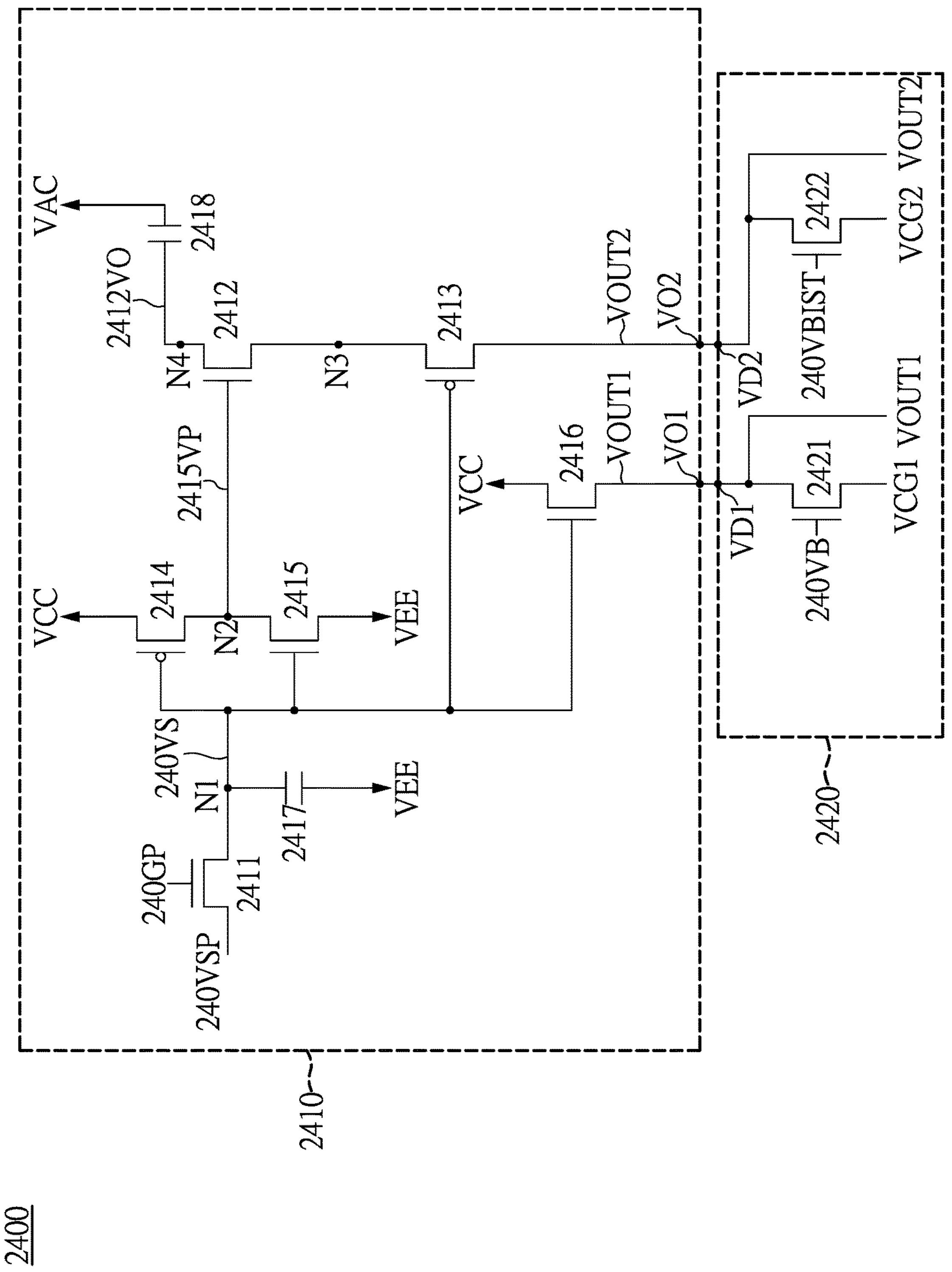
FIG. 24 is a schematic diagram of an AM-EWOD driving system 2400 in accordance with yet another embodiment of the present disclosure.

FIG. 24 is a schematic diagram of an AM-EWOD driving system in accordance with yet another embodiment of the present disclosure.

The AM-EWOD driving system 2400 may include a pixel electrode circuit 2400 and a detection circuit 2420. The pixel electrode circuit 2400 may be a cascode pull-down circuit, which includes transistors 2411, 2411, 2413, 2414, 2415, 2416, and a capacitor 2417.

The transistor 2411 may be a switch controlled by a control signal 240GP. The transistor 2411 may have a first terminal coupled to the input voltage 240VSP. The transistor 2411 may have a second terminal coupled to a first node N1.

The transistor 2412 may have a gate coupled node N2. The transistor 2412 may have a terminal (such as a drain) coupled to node N4. The node N4 refers to an output terminal of the pixel electrode circuit 2410 providing an output voltage 2412VO. The transistor 2412 may have a terminal (such as a source) coupled to node N3.

The transistor 2413 may have a gate coupled node N1. The transistor 2413 may have a terminal (such as a drain) coupled to an output port VO2 of the pixel electrode circuit 2410. The output port VO2 provides an output voltage VOUT2. The transistor 2413 may have a terminal (such as a source) coupled to node N3.

In some embodiments, the transistor 2412 may be an N-type transistor, and the transistor 2413 may be a P-type transistor. In some other embodiments, the transistor 2412 may be a P-type transistor, and the transistor 2413 may be an N-type transistor.

The transistor 2414 supplies with power supply voltage VCC. The transistor 2415 supplies with power supply voltage VEE. The transistors 2414 and 2415 may form an inverter.

The transistor 2414 may have a gate coupled to node N1. The transistor 2414 may have a terminal (such as a drain) coupled to node N2. The transistor 2414 may have a terminal (a source) coupled to the power supply voltage VCC.

The transistor 2415 may have a gate coupled to node N1. The transistor 2415 may have a terminal (such as a drain) coupled to the node N2. The transistor 2415 may have a terminal (a source) coupled to the power supply voltage VEE.

The transistor 2416 may have a gate coupled to node N1. The transistor 2416 may have a drain coupled to the power supply voltage VCC. The transistor 2416 may have a source coupled to an output port VO1 providing an output voltage VOUT1.

The capacitor 2417 may be coupled between node N1 and the power supply voltage VEE. Equivalent capacitance 2418 may be an equivalent capacitance between a top plate electrode and the output terminal (e.g., node N4) of the pixel electrode circuit 2410. The voltage signal VAC (coupled to the top plate electrode) is an AC voltage signal. A terminal of the equivalent capacitance 2418 may be coupled to the output terminal (i.e., node N5) of the pixel electrode circuit 2410.

The detection circuit 2420 may include transistors 2421 and 2422. The transistor 2421 may be a switch controlled by a bias voltage 240VB and a control voltage VCG1 to read the output voltage VOUT1 from the pixel electrode circuit 2410. For example, the bias voltage 240VB may be applied to a control terminal (e.g., gate) of the transistor 2421. A first terminal of the transistor 2421 may be electrically connected to a first input port VD1 of the detection circuit 2420. A second terminal of the transistor 2421 may be controlled by the control voltage VCG1.

The transistor 2422 may be another switch controlled by a test-mode voltage 240VBIST and a control voltage VCG2 to read the output voltage VOUT2 from the pixel electrode circuit 2410. For example, the test-mode voltage 240VBIST may be applied to a control terminal (e.g., gate) of the transistor 2422. A first terminal of the transistor 2422 may be electrically connected to a second input port VD2 of the detection circuit 2420. A second terminal of the transistor 2422 may be controlled by the control voltage VCG2.

In some embodiments, the output voltages VOUT1 and VOUT2 can be used to externally detect a status of an internal voltage of each pixel when the built-in self-test (BIST) mode of the AM-EWOD driving system 2400 is enabled.

In some embodiments, the output voltage VOUT1 can be used to detect the voltage 240VS at node N1. When the control voltage VCG1 is a ground voltage (e.g., 0V or VEE) and the bias voltage 240VB is in a high logic state (e.g., higher than the threshold voltage Vth1 of the transistor 2421), the pixel electrode circuit 2410 may enter a first detection mode, and the transistor 2421 may function as a current source. At this time, the transistor 2416 may function as a source follower, and a current may flow through the transistors 2416 and 2421. Thus, the output voltage VOUT1 may approximately equal (240VS−Vth2), where Vth2 denotes the threshold voltage of the transistor 2416. Thus, the output voltage VOUT1 can be detected by an external analog-to-digital converter (ADC) circuit or external test equipment (not shown in FIG. 24) via the detection circuit 2420.

In some embodiments, the external testing equipment may be capable of determining whether the transistor 2411 of the pixel electrode circuit 2410 is working normally. For example, if the output voltage VOUT1 is not detected by the external testing equipment in the first detection mode, it may indicate that the transistor 2411 has failed, and the transistor 2416 is not turned on. In this case, the external testing equipment may determine that the transistor 2411 of the pixel electrode circuit 2410 is not working normally. If the output voltage VOUT1 is detected by the external testing equipment normally, the external testing equipment may determine that the transistor 2411 of the pixel electrode circuit 2410 is working normally. In addition, external testing equipment may load a lookup table recording relationships between the voltage 240VS and an operating temperature of the pixel electrode circuit 2410. In some embodiments, the operating temperature of the pixel electrode circuit 2410 increases as the voltage 240VS increases. The operating temperature of the pixel electrode circuit 2410 decreases as the voltage 240VS decreases. Therefore, the external testing equipment may estimate the current operating temperature of the pixel electrode circuit 2410 based on the lookup table using the detected output voltage VOUT1.

In some embodiments, when the control voltage VCG2 is a ground voltage (e.g., 0V or VEE) and the test-mode voltage 240VBIST is in the low logic state, the transistor 2422 is turned off. Furthermore, if the voltage 240VS at node N1 is equal to the power supply voltage VEE, the voltage 2415VP at node N2 will be equal to the power supply voltage VCC. Thus, the transistors 2412 and 2413 will be turned on, and the pixel electrode circuit 2410 may enter a second detection mode. The output voltage 2412VO of the pixel electrode circuit 2410 will be transferred to the output port VO2 through the transistors 2412 and 2413, and the output voltage VOUT2 will be equal to the output voltage 2412VO. Therefore, the output voltage VOUT2 at the output port VO2 can be detected by an external ADC circuit (not shown in FIG. 24) via the detection circuit 2420.

In some embodiments, the external testing equipment may be capable of determining whether the transistor 2412 or 2413 of the pixel electrode circuit 2410 is working normally. If no output voltage VOUT2 is detected by the external testing equipment in the second detection mode, it may indicate that the transistor 2412 or 2413 fails. In this case, the external testing equipment may determine that the transistor 2412 or 2413 of the pixel electrode circuit 2410 is not working normally. If the output voltage VOUT2 can be detected by the external testing equipment normally, the external testing equipment may determine that the transistors 2412 and 2413 of the pixel electrode circuit 2410 are working normally.

In some embodiments, when the pixel electrode circuit 2410 is in the second detection mode, the transistors 2412 and 2413 are turned on, and the transistor 2422 is turned off. Thus, the output port VO2 and the output terminal (e.g., node N4) of the pixel electrode circuit 2410 are floating since there is no current path from the output terminal (e.g., N4) of the pixel electrode circuit 2410 to the ground. Therefore, the voltage 2412VO at the output terminal (i.e., node N4) of the pixel electrode circuit 2410 will be similar to the voltage signal VAC due to the coupling effect. If a droplet exists between the pixel electrode circuit 2410 and a top plate electrode, the equivalent capacitance 2418 will be larger, and the amplitude of the coupled voltage signal 2412VO at node N4 will also be higher. In such a condition, the coupled voltage signal 2412VO at node N4 may be substantially the same as the voltage signal VAC.

If no droplet exists between the pixel electrode circuit 2410 and a top plate electrode, the equivalent capacitance 2418 will be lower, as will the amplitude of the coupled voltage signal 2412VO at node N4. In such a condition, the amplitude of the coupled voltage signal 2412VO at node N4 may be very low. Therefore, the external testing equipment can determine whether a droplet exists between the pixel electrode circuit 2410 and the top plate electrode according to the amplitude of the detected output voltage VOUT2.

In some embodiments, when the bias voltage 240VB and the control voltage VCG2 are ground voltages (e.g., 0V or VEE) and the test-mode voltage 240VBIST is in a high-logic state, the AM-EWOD driving system 2400 is in a normal operating mode (e.g., an EWOD mode). The normal operating mode may include a pull-down mode and a floating mode.

The input voltage 240VSP may range between VCC and VEE, and will charge the capacitor 2417. When the pixel electrode circuit 2410 enters a floating mode, the input voltage 240VSP is equal to the power supply voltage VCC (i.e., 240VSP=VCC). The voltage at node N2 is equal to the power supply voltage VEE. The voltage 240VS at node N1 is equal to the power supply voltage VCC. For purposes of description, it is assumed that VEE=−Vee and VCC=+Vcc, and the voltage signal VAC may be an AC voltage signal swing between +Vac and −Vac. In this situation, the voltage 2412VO at node N4 may follow the voltage signal VAC through the equivalent capacitance 2418.

If the voltage 2412VO at node N4 is positive, the transistor 2412 may be turned off, but the transistor 2413 is turned on due to the positive input voltage 240VS at node N1. The voltage 2412VO at the output terminal (i.e., node N4) of the pixel electrode circuit 24100 will not be pulled down to the ground since the current path through the transistors 2412 and 2413 does not exist. Therefore, the output terminal (i.e., node N4) of the pixel electrode circuit 2410 will be floating in this case, and the voltage 2412VO at node N4 may follow the voltage signal VAC through the equivalent capacitance 2418.

If the voltage 2412VO at node N4 is negative, the transistor 2412 will be turned on, and the transistor 2413 will be turned off since the voltage 2412VO may be transferred to node N3. Thus, the voltage 2412VO at the output terminal (i.e., node N4) of the pixel electrode circuit 2410 will not be pulled down to ground since the current path through the transistors 2412 and 2413 does not exist. Therefore, the output terminal (i.e., node N4) of the pixel electrode circuit 2410 will also be floating in this case, and the voltage 2412VO at node N4 may follow the voltage signal VAC through the equivalent capacitance 2418. Therefore, when the pixel electrode circuit 2410 enters the floating mode, the voltage 2412VO at the output terminal (i.e., node N4) of the pixel electrode circuit 2410 will be similar to the voltage signal VAC due to the coupling effect, and there will be no voltage difference between the pixel electrode circuit 24100 and the top plate electrode 110, and the droplet 130 will not move at this time.

When the pixel electrode circuit 2410 enters a pull-down mode, the input voltage 240VSP is equal to the power supply voltage VEE (i.e., VSP=VEE), and the voltage at node N2 is equal to the power supply voltage VCC, and the voltage at node N1 is equal to the power supply voltage VEE. In this situation, the transistors 2412, 2413 and 2422 will be turned on, and a current may flow through the transistors 2412, 2413, and 2422 to the ground. Therefore, the output terminal (i.e., node N4) of the pixel electrode circuit 2410 will be pulled down to ground even though node N4 is coupled to the voltage signal VAC through the equivalent capacitance 2418. Referring to the AM-EWOD driving system 100 of FIG. 1, voltage difference between the dielectric layer 120 and the top plate electrode 110, and it will change the contact angle of the droplet 130 to control movement of the droplet 130.

Figure 25A:
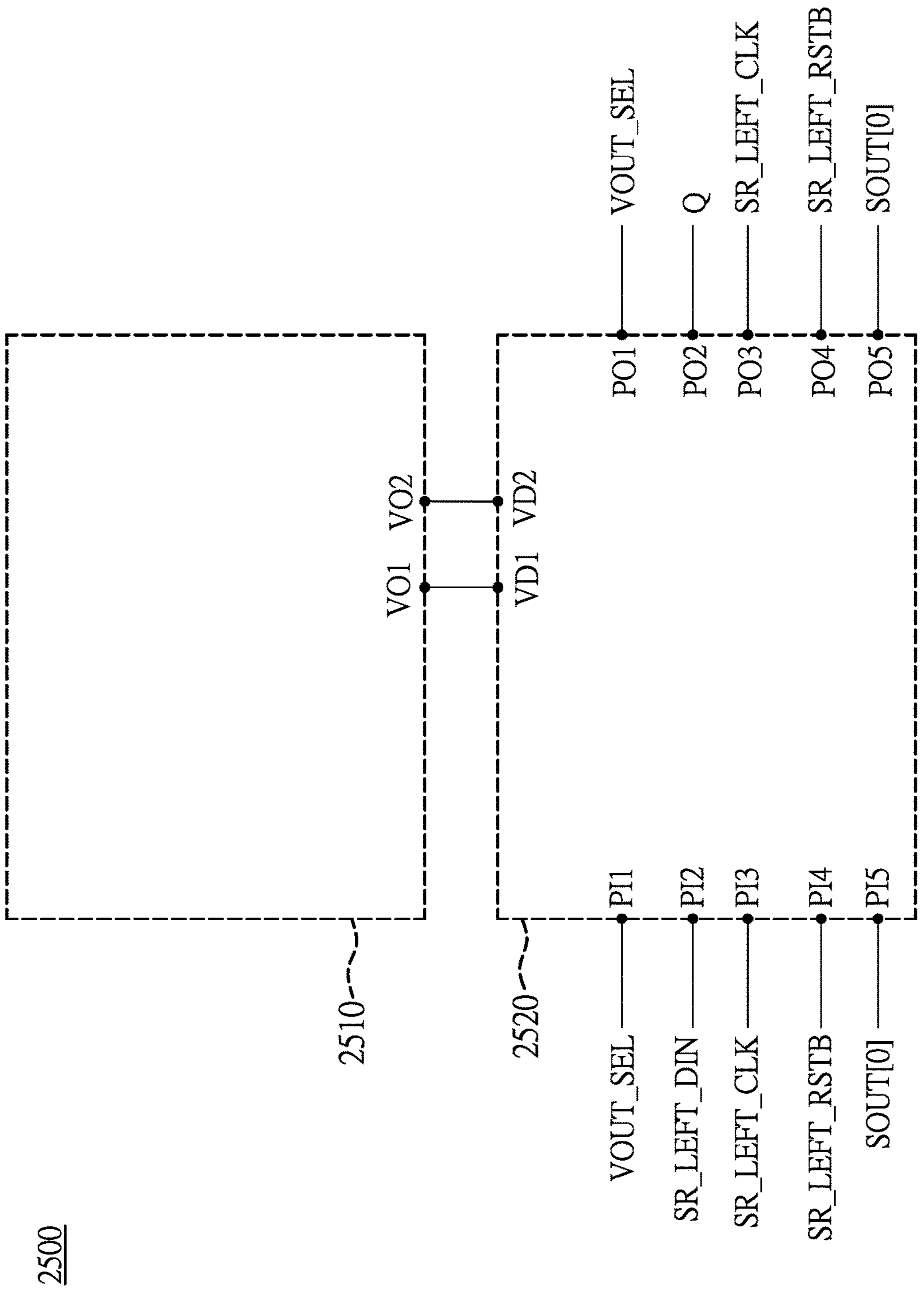
FIG. 25A is a block diagram of an AM-EWOD driving system 2500 in accordance with yet another embodiment of the present disclosure.
Figure 25B:
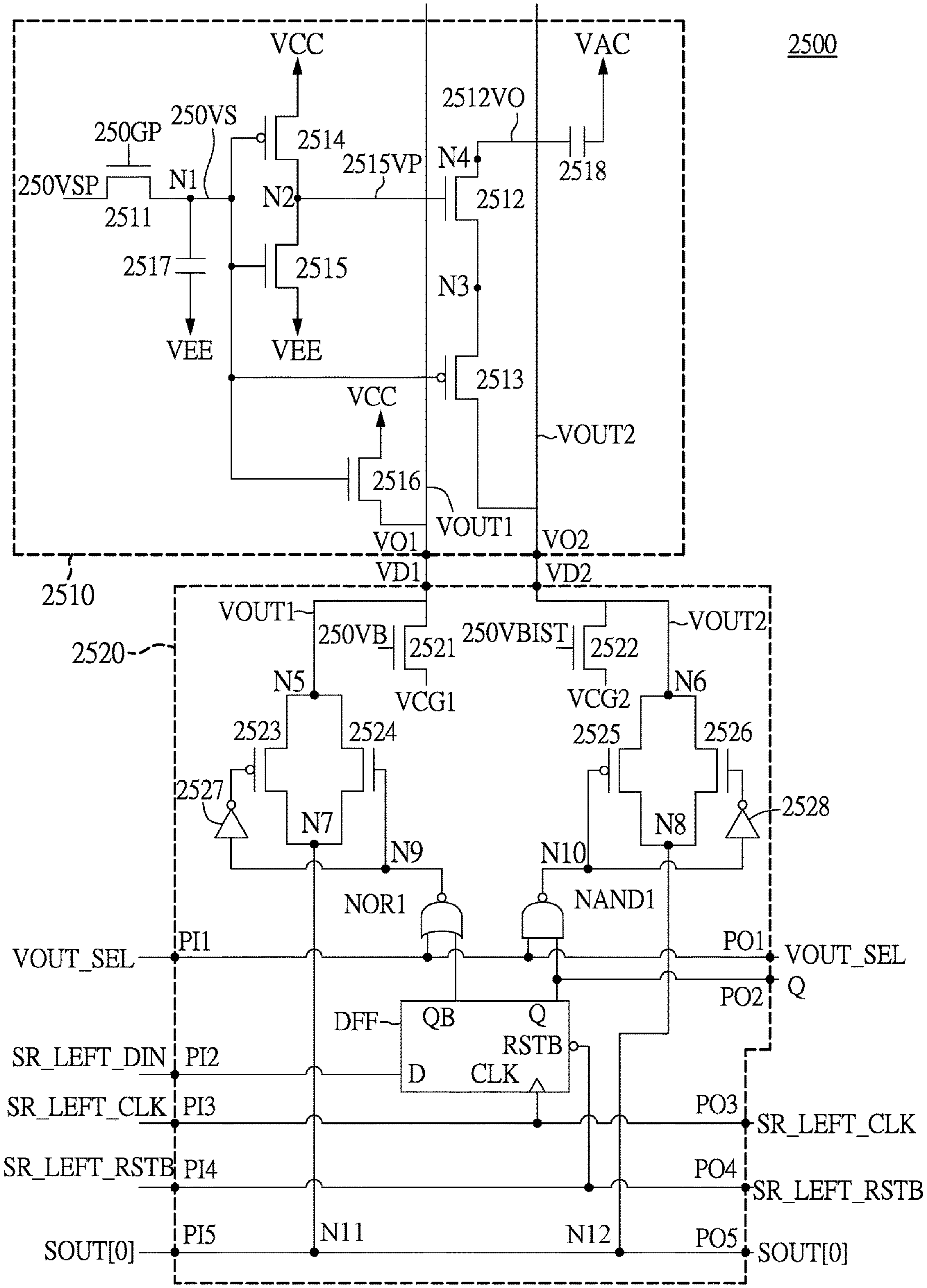
FIG. 25B is a schematic diagram of the AM-EWOD driving system 2500 of FIG. 25A.

FIG. 25A is a block diagram of an AM-EWOD driving system 2500 in accordance with yet another embodiment of the present disclosure. FIG. 25B is a schematic diagram of the AM-EWOD driving system 2500 of FIG. 25A.

In some embodiments, the AM-EWOD driving system 2500 may include a pixel electrode circuit 2510 and a detection circuit 2520, as depicted in FIG. 25A. The pixel electrode circuit 2510 may be similar to the pixel electrode circuit 2410 shown in FIG. 24, the details of which will not repeated here. The detection circuit 2520 may receive, at the input ports VD1 and VD2, the output voltages VOUT1 and VOUT2 from the output ports VO1 and VO2 of the pixel electrode circuit 2510, respectively.

In some embodiments, the detection circuit 2520 may further include input ports PI1, PI2, PI3, PI4, PI5 and output ports PO1, PO2, PO3, PO4, PO5. The input port PI1 may refer to an input voltage-selection port (SEL_IN). The input port PI2 may refer to an input data port (DIN). The input port PI3 may refer to an input clock port (CLK_IN). The input port PI4 may refer to an input reset port (RSTB_IN). The input port PI5 may refer to an input signal port (SIN).

The output port PO1 may refer to an output voltage-selection port (SEL_OUT). The output port PO2 may refer to an output data port (DOUT). The output port PO3 may refer to an output clock port (CLK_OUT). The output port PO4 may refer to an output reset port (RSTB_OUT). The output port PO5 may refer to an output signal port (SOUT).

In some embodiments, the input signals received by the input ports PI1, PI3, PI4, and PI5 may be bypassed to the output ports PO1, PO3, PO4, and PO5.

Referring to FIG. 25B, the detection circuit 2520 may include transistors 2521, 2522, 2523, 2524, 2555, 2526, inverters 2527, 2528, a D flip-flop DFF, a NOR gate NOR1, and a NAND gate NAND1. The transistors 2521 and 2522 in the detection circuit 2520 may be similar to the transistors 2421 and 2422 in the detection circuit 2420 shown in FIG. 24.

In some embodiments, the transistors 2523 and 2524 may form a CMOS transmission gate, and transistors 2525 and 256 may form another CMOS transmission gate. The CMOS transmission gates are controlled by digital logic gates (e.g., including inverters 2527, 2528, NOR1, and NAND1) and the D flip-flop DFF. In one embodiment, the CMOS transmission gate formed by the transistors 2523 and 2524 may be coupled between nodes N5 and N7. Node N5 is coupled to the input port VD1 of the detection circuit 2520. The input port VD1 may receive the output voltage VOUT1 from the output port VO1 of the pixel electrode circuit 2510. The CMOS transmission gate formed by the transistors 2525 and 2526 may be coupled between nodes N6 and N8. Node N6 is coupled to the input port VD2 of the detection circuit 2520 The input port VD2 may receive the output voltage VOUT2 from the output port VO2 of the pixel electrode circuit 2510.

In some embodiments, the D flip-flop DFF may include an input data terminal (D), an input clock terminal (CLK), an input reset terminal (RSTB), an output data terminal (Q), and an inverse output data terminal (QB). The input data terminal (D) may be connected to the input port PI2 which receives an input data signal SR_LEFT_DIN. The input clock terminal (CLK) may be connected to the input port PI3 which receives an input data signal SR_LEFT_CLK. The input reset terminal (RSTB) may be connected to the input port PI4 which receives an input reset signal SR_LEFT_RSTB. The output data terminal (Q) may be connected to an input terminal of the NAND gate NAND1 and the output port PO2 of the detection circuit 2520. The output port PO2 may output an output data signal Q generated by the D flip-flop DFF. The input signal VOUT_SEL may be input to another input terminal of the NAND gate NAND1. The inverse data terminal (QB) may be connected to an input terminal of the NOR gate NOR1. The input signal VOUT_SEL may be input to another input terminal of the NOR gate NOR1.

The output terminal (e.g., node N10) of the NAND gate NAND1 may be connected to an input terminal of the inverter 2528 and a gate of the transistor 2525. The output terminal of the inverter 2528 may be connected to a gate of the transistor 2526. The output terminal (e.g., node N9) of the NOR gate NOR1 may be connected to an input terminal of the inverter 2527 and a gate of the transistor 2524. The output terminal of the inverter 2527 may be connected to a gate of the transistor 2523.

In some embodiments, when the output data signal Q of the D flip-flop DFF is in the low logic state (i.e., Q=0), the output signal of the NAND gate NAND1 at node N10 will be in the high logic state, and the output signal of the inverter 2528 will be in the low logic state. Thus, the transistors 2525 and 2526 are turned off, and the output voltage VOUT2 will not pass through the CMOS transmission gate formed by the transistors 2525 and 2526.

Similarly, when the output data signal Q of the D flip-flop DFF is in the low logic state (e.g., Q=0), the inverse output data signal QB of the D flip-flop DFF is in the high logic state (e.g., QB=1). The output signal of the NOR gate NOR1 at node N9 will be in the low logic state, and the output signal of the inverter 2527 will be in the high logic state. Thus, the transistors 2523 and 2524 are turned off, and the output voltage VOUT1 will not pass through the CMOS transmission gate formed by the transistors 2523 and 2524. Specifically, when the output data signal Q of the D flip-flop DFF is in the low logic state (i.e., Q=0), the CMOS transmission gates (e.g., transistors 2523-2524 and 2525-2526) will be turned off no matter whether the input voltage selection signal is in the low logic state or the high logic state.

When the output data signal Q of the D flip-flop DFF is in the high logic state (e.g., Q=1) and the voltage-selection signal VOUT_SEL is in the low logic state (e.g., VOUT_SEL=0), the output signal of the NAND gate NAND1 is in the high logic state, and the output signal of the inverter 2528 is in the low logic state. Thus, the transistors 2525 and 2526 are turned off, and the output voltage VOUT2 received from the output port VO2 of the pixel electrode circuit 2510 cannot pass through the CMOS transmission gate (e.g., transistors 2525 and 2526). At this time, the inverse output data signal QB of the D flip-flop DFF is in the low logic state (e.g., QB=0), and the output signal of the NOR gate NOR1 is in the high logic state, and the output signal of the inverter 2527 is in the low logic state. Thus, the transistors 2523 and 2524 are turned on, and the output voltage VOUT1 received from the output port VO1 of the pixel electrode circuit 2510 will pass through the CMOS transmission gate (e.g., transistors 2523 and 2524) to reach the detection line SOUT[0] connected between the input port PI5 and the output port PO5.

When the output data signal Q of the D flip-flop DFF and the voltage-selection signal VOUT_SEL are in the high logic state (e.g., Q=1, and VOUT_SEL=1), the inverse output data signal QB of the D flip-flop DFF is in the low logic state (e.g., QB=0). The output signal of the NOR gate NOR1 is in the low logic state, and the output signal of the inverter 2528 is in the high logic state. Thus, the transistors 2523 and 2526 are turned off, and the output voltage VOUT1 received from the output port VO1 of the pixel electrode circuit 2510 cannot pass through the CMOS transmission gate (e.g., transistors 2523 and 2524). At this time, the output signal of the NAND gate NAND1 is in the low logic state, and the output signal of the inverter 2528 is in the high logic state. Thus, the transistors 2525 and 2526 are turned on, and the output voltage VOUT2 received from the output port VO2 of the pixel electrode circuit 2510 will pass through the CMOS transmission gate (e.g., transistors 2525 and 2526) to reach the detection line SOUT[0] connected between the input port PI5 and the output port PO5.

Figure 26:
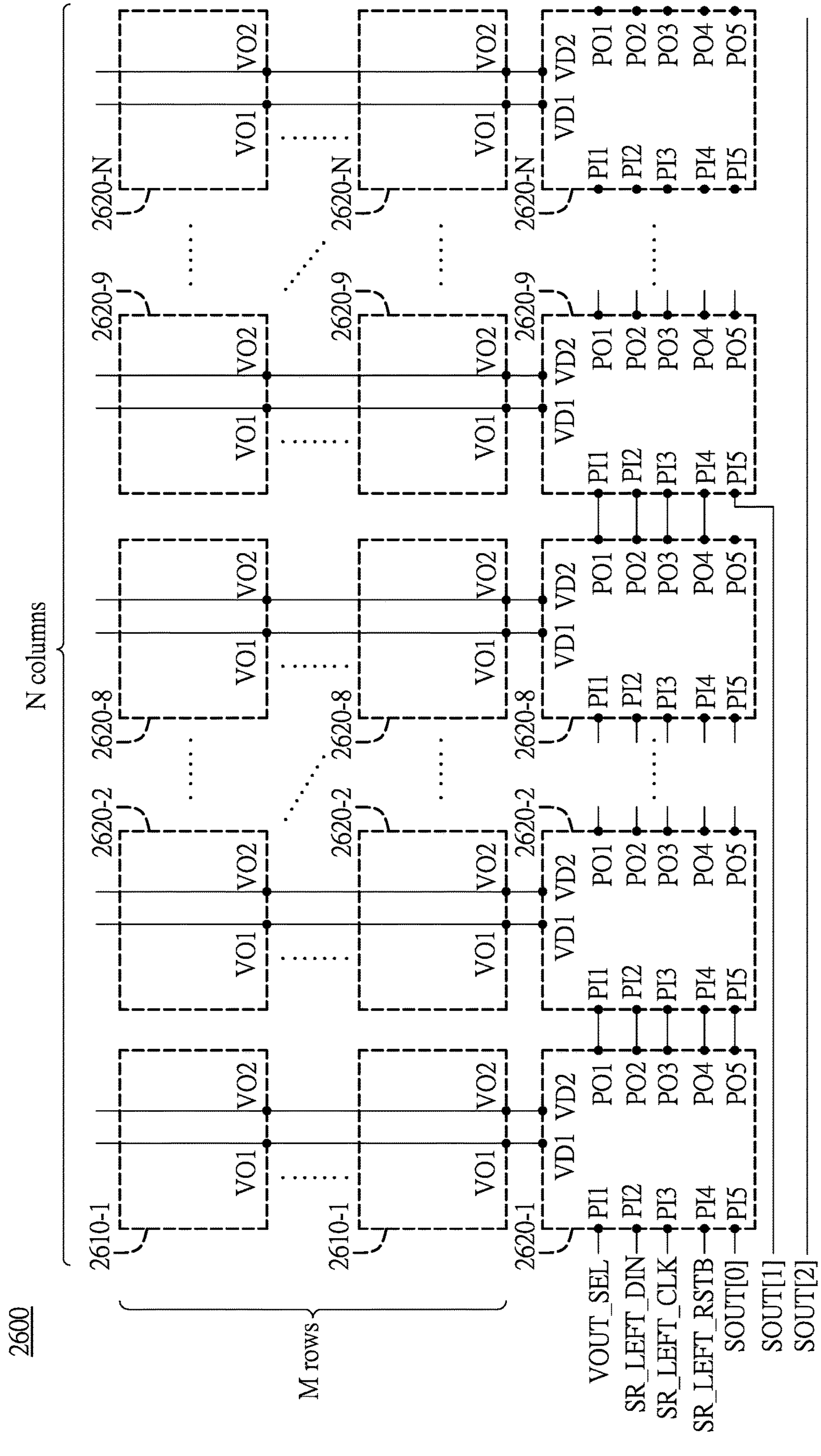
FIG. 26 is a block diagram of an AM-EWOD driving system 2600 in accordance with yet another embodiment of the present disclosure.

FIG. 26 is a block diagram of an AM-EWOD driving system 2600 in accordance with yet another embodiment of the present disclosure. Please refer to FIGS. 25A-25B and FIG. 26.

In some embodiments, the AM-EWOD driving system 2600 may include a plurality of pixel electrode circuits 2610 (e.g., 2610-1 to 2610-N) and a plurality of detection circuits 2620 (e.g., 2620-1 to 2620-N). The pixel electrode circuits 2610 may be arranged in a two-dimensional array of M rows*N columns which is similar to the arrangement of pixel electrodes 121 shown in FIG. 1B. Each row of the two-dimensional array may include pixel electrode circuits 2610-1 to 2610-N.

The pixel electrode circuits 2610-1 to 2610-N may be implemented using the pixel electrode circuit 2510 shown in FIGS. 25A-25B. The detection circuits 2620-1 to 2620-N may be implemented using the detection circuit 2520 shown in FIGS. 25A-25B, and they can be arranged in a row next to the N-th row of the pixel electrode circuits 2610-1 to 2610-N, as depicted in FIG. 26.

In some embodiments, the AM-EWOD driving system 2600 may further include a top plate electrode and a dielectric layer (not shown in FIG. 26) which are similar to those shown in FIG. 1A, and thus the details of which will not be repeated here.

In some embodiments, the pixel electrode circuits 2610 in the same column may share the same detection circuit 2620. In some embodiments the pixel electrode circuit 2610-1 in each row may share the same detection circuit 2620-1, and the pixel electrode circuit 2620-2 in each row may share the same detection circuit 2620-2, and so on. In addition, the output ports VO1 and VO2 of the pixel electrode circuit 2610 in the same column are connected to the input ports VD1 and VD2 of the same detection circuit 2620, respectively, as shown in FIG. 26.

In some embodiments, the detection circuits 2620-1 to 2620-N can be connected in series. The signals received by the input ports PI1, PI3 and PI4 of the detection circuit 2620-1 may be bypassed to the output ports PO1, PO3, and PO4 of the detection circuit 2620-1. Similarly, the signals received by the input ports PI1, PI3 and PI4 of the detection circuit 2620-2 may be bypassed to the output ports PO1, PO3, and PO4 of the detection circuit 2620-2, and so on.

In some embodiments, the D flip-flop DFF of the detection circuits 2620-1 to 2620-N are connected in series. In some embodiments, the input data signal SR_LEFT_DIN received by the input port PI2 of the detection circuit 2620-1 may be hold by the D flip-flop DFF in the detection circuit 2620-1, and the output data signal Q of the D flip-flop DFF of the detection circuit 2620-1 may be transmitted to the input port PI2 of the detection circuit 2620-1. The output data Q of the D flip-flop DFF of the detection circuit 2620-2 may be transmitted to the input port PI2 of the sensing 2620-3, and so on. In other words, the D flip-flops of the detection circuits 2620-1 to 2620-N may form a scan chain that can be used to decide which column of the output voltage VOUT1 or VOUT2 can be detected by the respective detection line.

In some embodiments, the detection circuits 2620 may be divided into a plurality of groups, and each group may include a predetermined number of detection circuits 2620. For purposes of description, each group may include 8 detection circuits 2620. The detection circuits 2620 in the same group may share the same detection line SOUT. For example, the detection circuits 2620-1 to 2620-8 may share the detection line SOUT[0], and the detection circuits 2620-9 to 2620-16 may share the detection line SOUT[1], and so on. More specifically, one of the pixel electrode circuits 2610 in the two-dimensional array is activated at one time. Thus, only one column of the two-dimensional array may be activated at one time, and there will be only one 1 in the scan chain of D flip-flops. When the voltage-selection signal VOUT_SEL is in the low logic state, the output voltage VOUT of the activated pixel electrode circuit 2610 can be detected on the respective detection line. When the voltage-selection signal VOUT_SEL is in the high logic state, the output voltage VOUT2 of the activated pixel electrode circuit 2610 can be detected on the respective detection line.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An apparatus, comprising:

a pixel electrode circuit, comprising:

- a first switch, controlled by a first control signal, the first switch comprising a first terminal electrically connected to a first voltage, and a second terminal electrically connected to a first node;
- an inverter, coupled between the first node and a second node;
- a first transistor, having a gate electrically connected to the first node, a first terminal connected to a first power supply voltage, and a second terminal connected to a first output port of the pixel electrode circuit;
- a second transistor, having a gate electrically connected to the first node, a first terminal connected to a third node, and a second terminal connected to a second output port of the pixel electrode circuit; and
- a third transistor, having a gate electrically connected to the second node, a first terminal connected to a fourth node, and a second terminal connected to the third node; and a detection circuit, comprising:

- a second switch, controlled by a bias voltage, the second switch comprising a first terminal electrically connected to the first output port of the pixel electrode circuit, and a second terminal connected to a first control voltage; and a third switch, controlled by a test-mode voltage, the third switch comprising a first terminal electrically connected to the second output port of the pixel electrode circuit, and a second terminal connected to a second control voltage.

2. The apparatus of claim 1, wherein the pixel electrode circuit further comprises: a first capacitor and a second capacitor, wherein the first capacitor is coupled between the first node and a second power supply voltage, and the fourth node is coupled to an AC voltage through the second capacitor.

3. The apparatus of claim 1, wherein the second transistor is a P-type transistor, and the third transistor is an N-type transistor.

4. The apparatus of claim 1, wherein the second transistor is an N-type transistor, and the third transistor is a P-type transistor.

5. The apparatus of claim 2, wherein the inverter comprises:

a fourth transistor, having a gate connected to the first node, a first terminal connected to the first power supply voltage, and a second terminal connected to the second node; and a fifth transistor, having a gate connected to the first node, a first terminal connected to the second node, and a second terminal connected to the second power supply voltage.

6. The apparatus of claim 2, wherein the first power supply voltage is a positive power supply voltage, and the second power supply voltage is a negative power supply voltage.

7. The apparatus of claim 1, wherein:

when the second terminal of the second switch is grounded and the bias voltage is in a high logic state, the second switch is turned on, the pixel electrode circuit enters a first detection mode, and a first output voltage at the first output port of the pixel electrode circuit is sensed by an external analog-to-digital converter through the detection circuit; and when the second terminal of the third switch is grounded and the test-mode voltage is in a low logic state, the third switch is turned off, the pixel electrode circuit enters a second detection mode, and a second output voltage at the second output port of the pixel electrode circuit is sensed by the external analog-to-digital converter through the detection circuit.

8. The apparatus of claim 7, wherein when the bias voltage and the second control voltage are ground voltages and the test-mode voltage is in a high-logic state, the pixel electrode circuit enters a normal operating mode.

9. The apparatus of claim 7, wherein it is determined whether the first switch is working normally when the pixel electrode circuit is in the first detection mode.

10. The apparatus of claim 9, wherein when the first output voltage is not detected by external testing equipment, it is determined that the first switch is not working normally, wherein when the first output voltage is detected by the external testing equipment, it is determined that the first switch is working normally.

11. The apparatus of claim 10, wherein a current operating temperature of the pixel electrode circuit is estimated based on a lookup table using the first output voltage.

12. The apparatus of claim 7, wherein it is determined whether the second transistor and the third transistor is working normally when the pixel electrode circuit is in the second detection mode.

13. The apparatus of claim 12, wherein when the second output voltage is not detected by external testing equipment, it is determined that the second transistor or the third transistor is not working normally, wherein when the second output voltage is detected by the external testing equipment, it is determined that the second transistor and the third transistor is working normally.

14. The apparatus of claim 8, wherein the detection circuit further comprises:

a D flip-flop, configured to hold an input data signal;

a NAND gate, having a first terminal connected to an output data terminal of the D flip-flop, and a second terminal connected to a voltage-selection signal;

a NOR gate, having a first terminal connected to an inverse output data terminal of the D flip-flop, and a second terminal connected to the voltage-selection signal;

a first CMOS transmission gate, coupled between a fifth node and the second terminal of the third switch, and controlled by a first signal generate by the NAND gate and a second signal complementary to the first signal; and a second CMOS transmission gate, coupled between a sixth node and the second terminal of the second switch, and controlled by a third signal generated by the NOR gate and a fourth signal complementary to the third signal, wherein the fifth node and the sixth node are on a detection line.

15. A system, comprising:

a top plate electrode;

a dielectric layer, wherein a droplet is disposed between the top plate electrode and the dielectric layer;

a plurality of pixel electrode circuits, arranged in a two-dimensional array; and a plurality of detection circuits, wherein the pixel electrode circuits in each column of the two-dimensional array are electrically connected to a respective detection circuit of the plurality of detection circuits, wherein each of the plurality of pixel electrode circuits comprises:

a first switch, controlled by a first control signal, the first switch comprising a first terminal electrically connected to a first voltage, and a second terminal electrically connected to a first node;

an inverter, coupled between the first node and a second node;

a first transistor, having a gate electrically connected to the first node, a first terminal connected to a first power supply voltage, and a second terminal connected to a first output port of the pixel electrode circuit;

a second transistor, having a gate electrically connected to the first node, a first terminal connected to a third node, and a second terminal connected to a second output port of the pixel electrode circuit; and a third transistor, having a gate electrically connected to the second node, a first terminal connected to a fourth node, and a second terminal connected to the third node.

16. The system of claim 15, wherein each of the detection circuits comprises:

a second switch, controlled by a bias voltage, the second switch comprising a first terminal electrically connected to the first output port of the pixel electrode circuit, and a second terminal connected to a first control voltage;

a third switch, controlled by a test-mode voltage, the third switch comprising a first terminal electrically connected to the second output port of the pixel electrode circuit, and a second terminal connected to a second control voltage;

a D flip-flop, configured to hold an input data signal;

a NAND gate, having a first terminal connected to an output data terminal of the D flip-flop, and a second terminal connected to a voltage-selection signal;

a NOR gate, having a first terminal connected to an inverse output data terminal of the D flip-flop, and a second terminal connected to the voltage-selection signal;

a first CMOS transmission gate, coupled between a fifth node and the second terminal of the third switch, and controlled by a first signal generate by the NAND gate and a second signal complementary to the first signal; and a second CMOS transmission gate, coupled between a sixth node and the second terminal of the second switch, and controlled by a third signal generated by the NOR gate and a fourth signal complementary to the third signal.

17. The system of claim 16, wherein the plurality of detection circuits are divided into a plurality of groups, and the fifth node and the sixth node of the detection circuits in the same group are on a respective detection line.

18. The system of claim 17, wherein the D flip-flop of each detection circuit is connected in series.

19. The system of claim 18, wherein one of the pixel electrode circuits is activated at one time, and one column of the two-dimensional array is activated at one time, wherein when the voltage-selection signal is in a low logic state, a first output voltage of the activated pixel electrode circuit is detected on the respective detection line, wherein when the voltage-selection signal is in a high logic state, a second output voltage of the activated pixel electrode circuit is detected on the respective detection line.

* * * * *